(12) United States Patent
Fukuda et al.

(10) Patent No.: US 8,554,752 B2
(45) Date of Patent: Oct. 8, 2013

(54) INFORMATION PROVIDING SYSTEM, INFORMATION RECEIVING APPARATUS, INFORMATION PROVIDING APPARATUS, INFORMATION PROVIDING METHOD AND PROGRAM

(75) Inventors: Kazuhiro Fukuda, Kanagawa (JP); Tetsuo Maruyama, Tokyo (JP); Ippei Tambata, Kanagawa (JP); Daisuke Kawamura, Tokyo (JP); Asako Honjo, Tokyo (JP)

(73) Assignee: Sony Corporation, Tokyo (JP)

( * ) Notice: Subject to any disclaimer, the term of this patent is extended or adjusted under 35 U.S.C. 154(b) by 1092 days.

(21) Appl. No.: 12/119,780

(22) Filed: May 13, 2008

(65) Prior Publication Data

US 2008/0306967 A1 Dec. 11, 2008

(30) Foreign Application Priority Data

Jun. 8, 2007 (JP) ................................. 2007-153233

(51) Int. Cl.
G06F 17/30 (2006.01)
G06F 7/00 (2006.01)

(52) U.S. Cl.
USPC .......................................... 707/703; 707/802

(58) Field of Classification Search
USPC .................. 707/703, 802; 709/229
See application file for complete search history.

(56) References Cited

U.S. PATENT DOCUMENTS

| | | | |
|---|---|---|---|
| 6,901,462 B2 * | 5/2005 | Minoshima et al. | 710/29 |
| 2001/0042170 A1 * | 11/2001 | Belknap et al. | 711/118 |
| 2005/0010673 A1 * | 1/2005 | Satuloori et al. | 709/231 |
| 2007/0050479 A1 * | 3/2007 | Yoneda | 709/219 |
| 2007/0107010 A1 * | 5/2007 | Jolna et al. | 725/34 |
| 2007/0129140 A1 * | 6/2007 | Walker et al. | 463/25 |
| 2009/0077490 A1 * | 3/2009 | Hanada et al. | 715/810 |

FOREIGN PATENT DOCUMENTS

| | | |
|---|---|---|
| EP | 1 768 267 A1 | 3/2007 |
| JP | 2000-299845 | 10/2000 |
| JP | 2003-203035 | 7/2003 |
| JP | 2005-124163 | 5/2005 |
| JP | 2006-319553 | 11/2006 |
| JP | 2007-60496 | 3/2007 |
| JP | 2007-116719 | 5/2007 |
| WO | WO 99/60784 | 11/1999 |

OTHER PUBLICATIONS

JP-2005-167891.*
U.S. Appl. No. 12/060,595, filed Apr. 1, 2008, Fukuda, et al.
U.S. Appl. No. 12/114,303, filed May 2, 2008, Fukuda, et al.

* cited by examiner

Primary Examiner — Kuen Lu
(74) Attorney, Agent, or Firm — Oblon, Spivak, McClelland, Maier & Neustadt, L.L.P.

(57) ABSTRACT

The information receiving apparatus includes the related information receiving portion to receive content-related information, the mode selecting portion to select a link condition between the content and the related information, the related information request transmitting portion to transmit content designation information when the link condition is switched to the link mode or the content is switched in the link mode, and the display control portion to display the content, related information and link condition. The information providing apparatus includes the related information storage portion to store the related information associating with the content, the related information request receiving portion to receive the content designation information, the related information extracting portion to extract the related information corresponding to the content, and the related information transmitting portion to transmit the related information. This provides the information providing system enabling browsing of the related information with or without a link to the content.

21 Claims, 32 Drawing Sheets

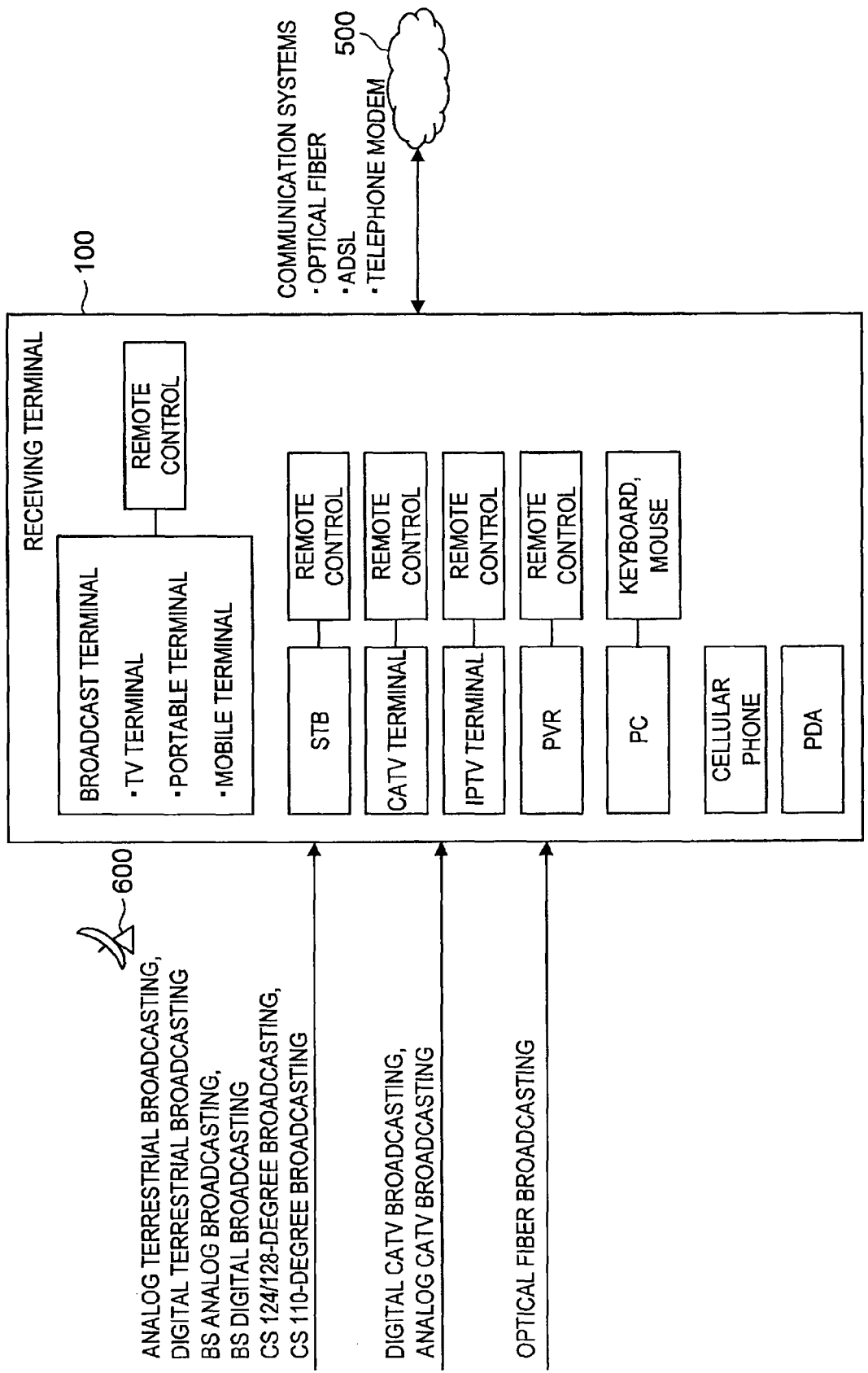

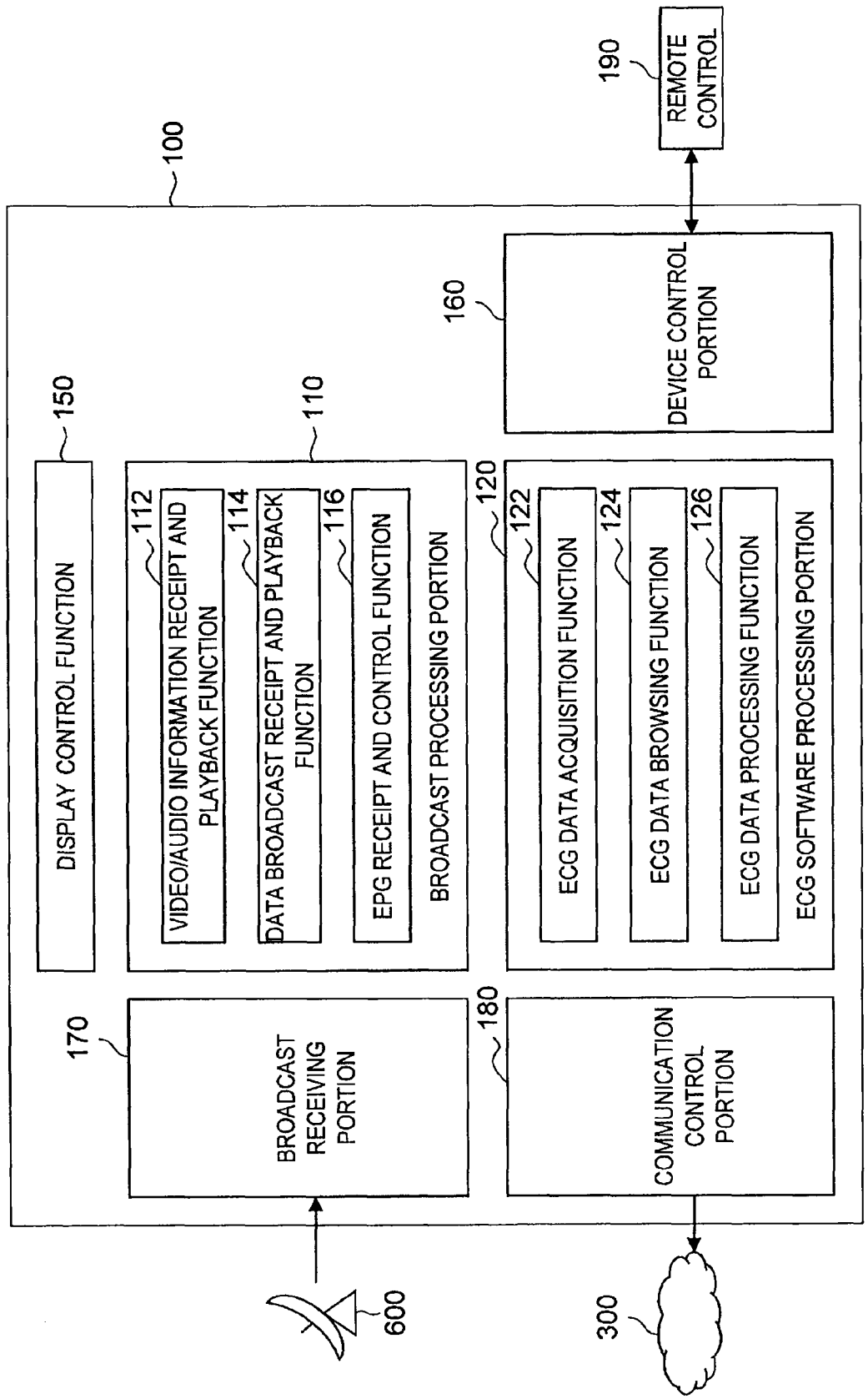

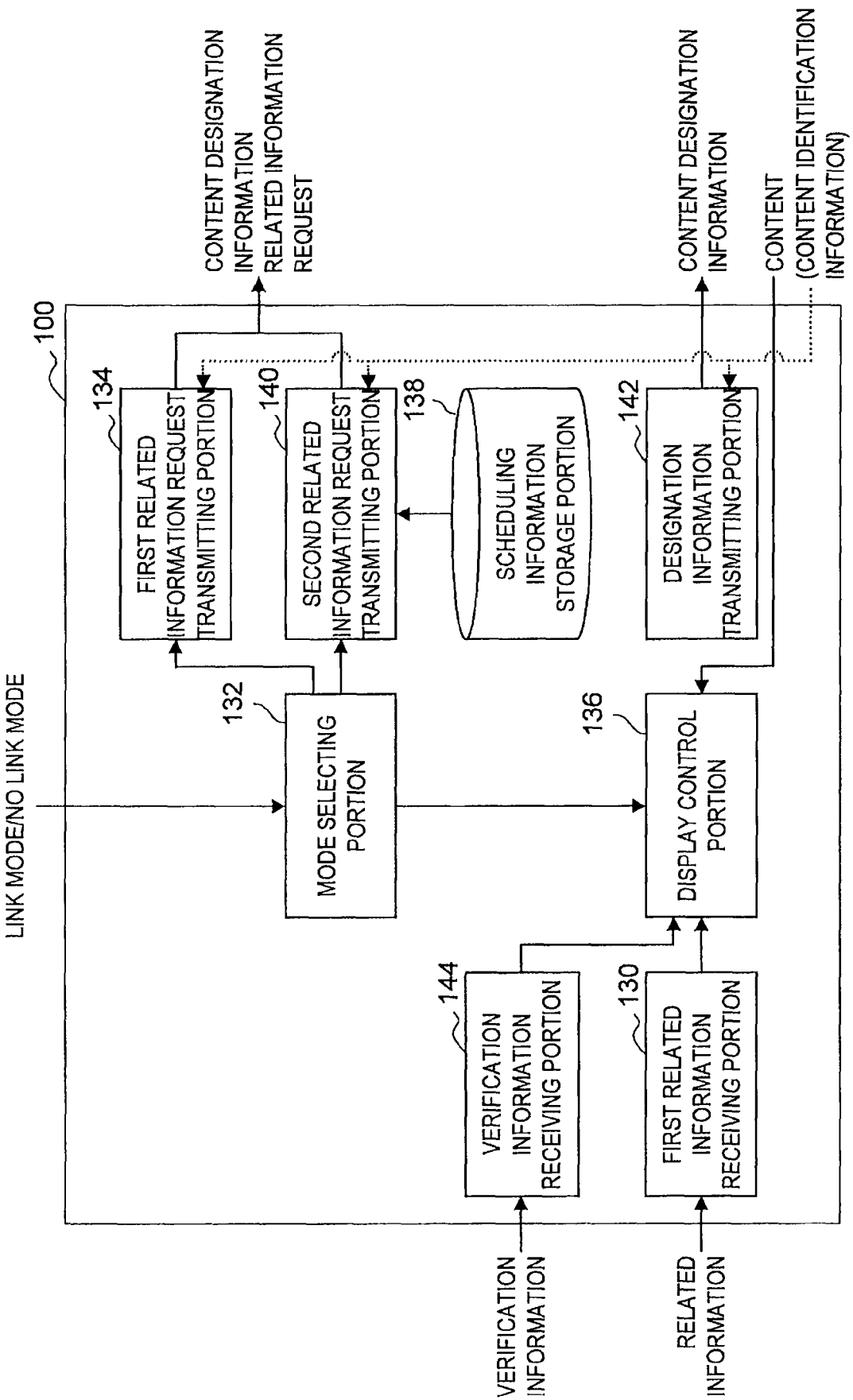

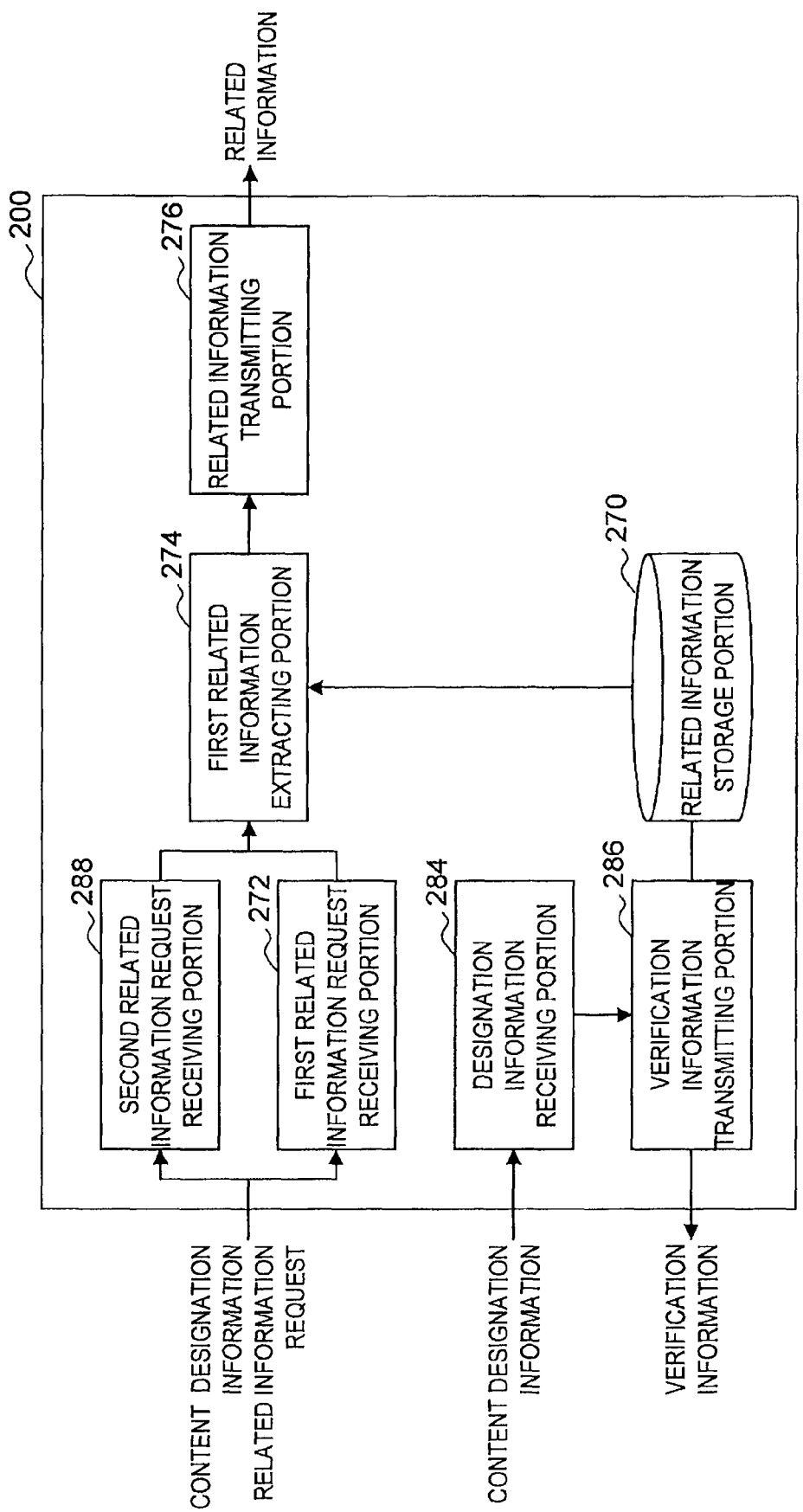

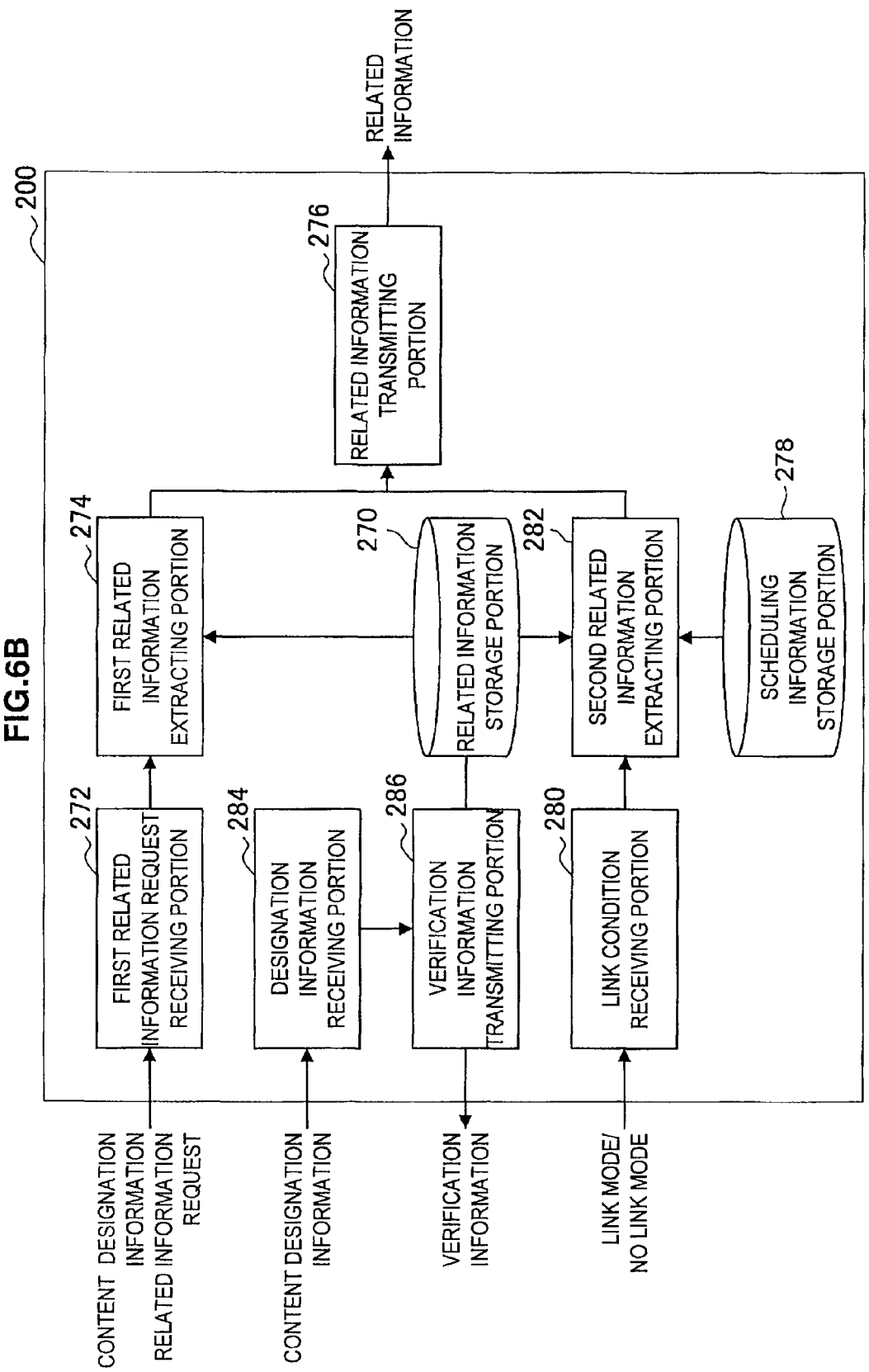

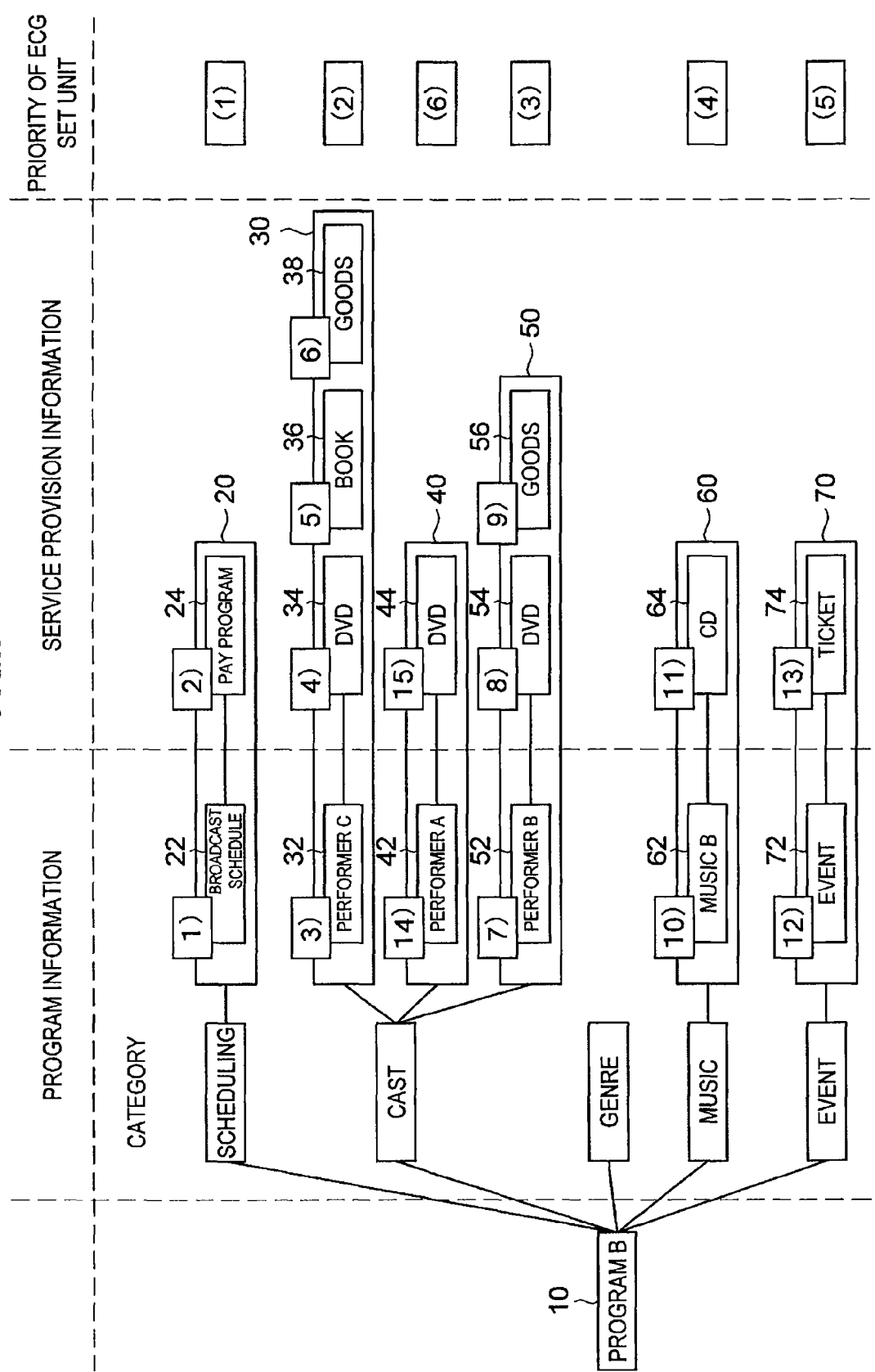

FIG.9A

```
<program id="P00001" name="PROFESSIONAL STYLE" genre="DOCUMENTARY" keywords="AAA AAA BBB BBB KNOW-HOW IMPRESSION" >
  <oa start_date="2007/7/1" start_time="13:00:00" end_time="15:00:00"/>
  <details>
    <CreditsList>
      <Person id="1_1" name="AAA AAA"  Birthplace="Japan"/>
      <Person id="1_2" name="BBB BBB"  Birthplace="Japan"/>
      <Person id="1_3" name="CCC CCC"  Birthplace="Japan"/>
    </CreditsList>
  </details>
  </oa>
  <relation id="AA1" reference_id_list ="L00001"/>
</program>
```

FIG.9B

```
<content id="C00001" name="PRODUCT 1" genre="PUBLICATION" keywords="XXX YYY ZZZ" maker="zony" price="100 YEN"
content_info="www.zony.co.jp "/>
```

FIG.10A

```xml
<program_relation id="L00001" name="HHH" start_date="2007/1/1" start_time="13:00:00" end_date="2007/1/1" end_time="15:00:00" >
    <link_program id="1" program_id="P00001" genre="SHOPPING "/>
    <link_content id="1" content_id="C00001" genre="SPORT"/>
    <link_content id="2" content_id="C00002" genre="DVD"/>
    <link_content id="3" content_id="C00003" genre="PUBLICATION"/>
</program_relation>
```

FIG.10B

```xml
<ecg_set id="es00001" name="GGG" start_date="2007/1/1" start_time="13:00:00" end_date="2007/1/1" end_time="15:00:00" >
    <content id="1" type="program" program_id="P00001"/>
    <content id="2" type="content" content_id="C00001"/>
    <content id="3" type="content" content_id="C00002"/>
    <content id="4" type="content" content_id="C00003"/>
    <content id="5" type="content" content_id="C00004"/>
</ecg_set>
```

FIG.10C

```xml
<ecg_scenario id="sc00011" name="GGG" start_date="2007/1/1" start_time="13:00:00" end_date="2007/1/1" end_time="15:00:00" >
    <content id="1" ecg_set_id="es00001"/>
    <content id="2" ecg_set_id="es00002"/>
    <content id="3" ecg_set_id="es00003"/>
    <content id="4" ecg_set_id="es00004"/>
</ecg_scenario>
```

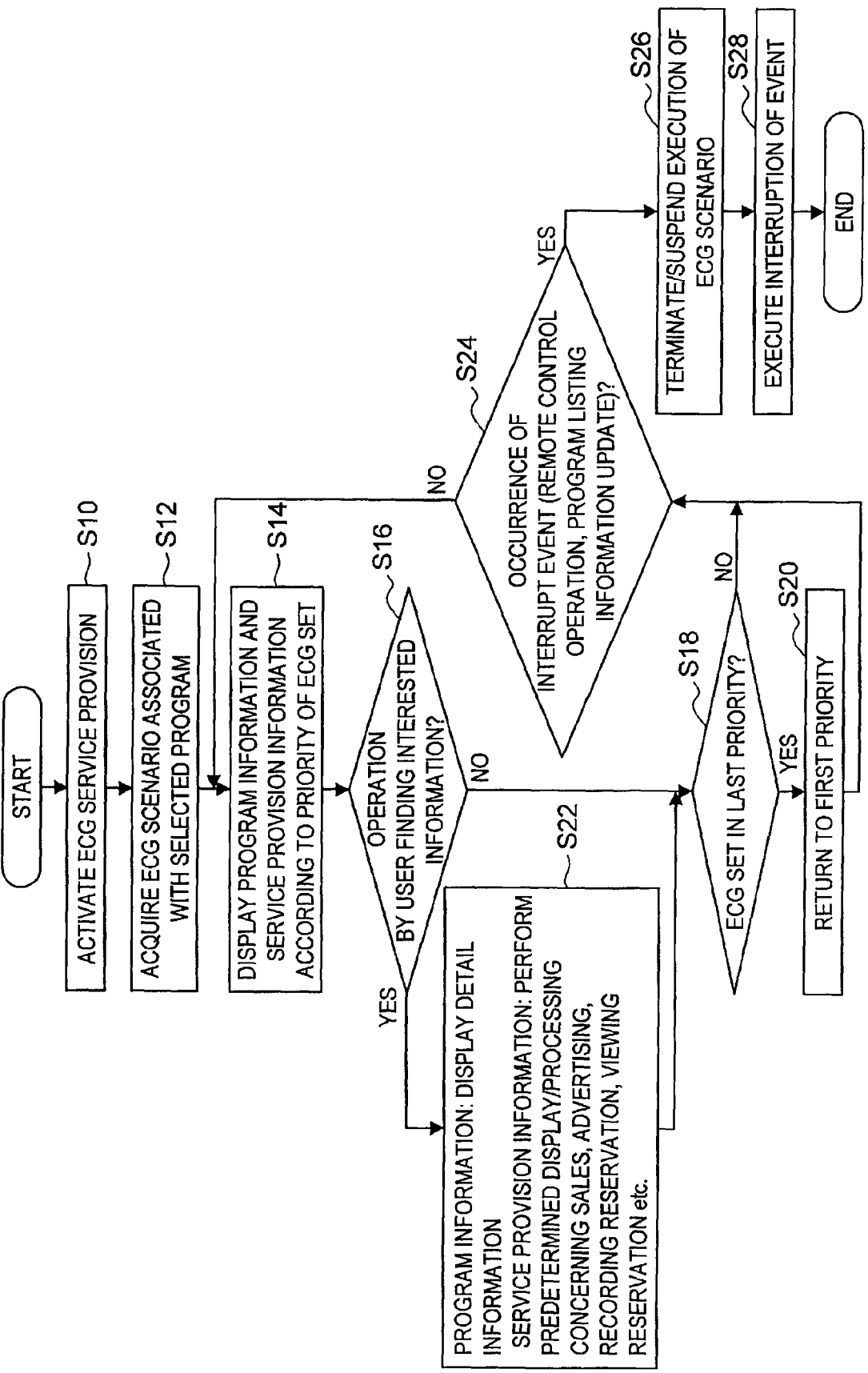

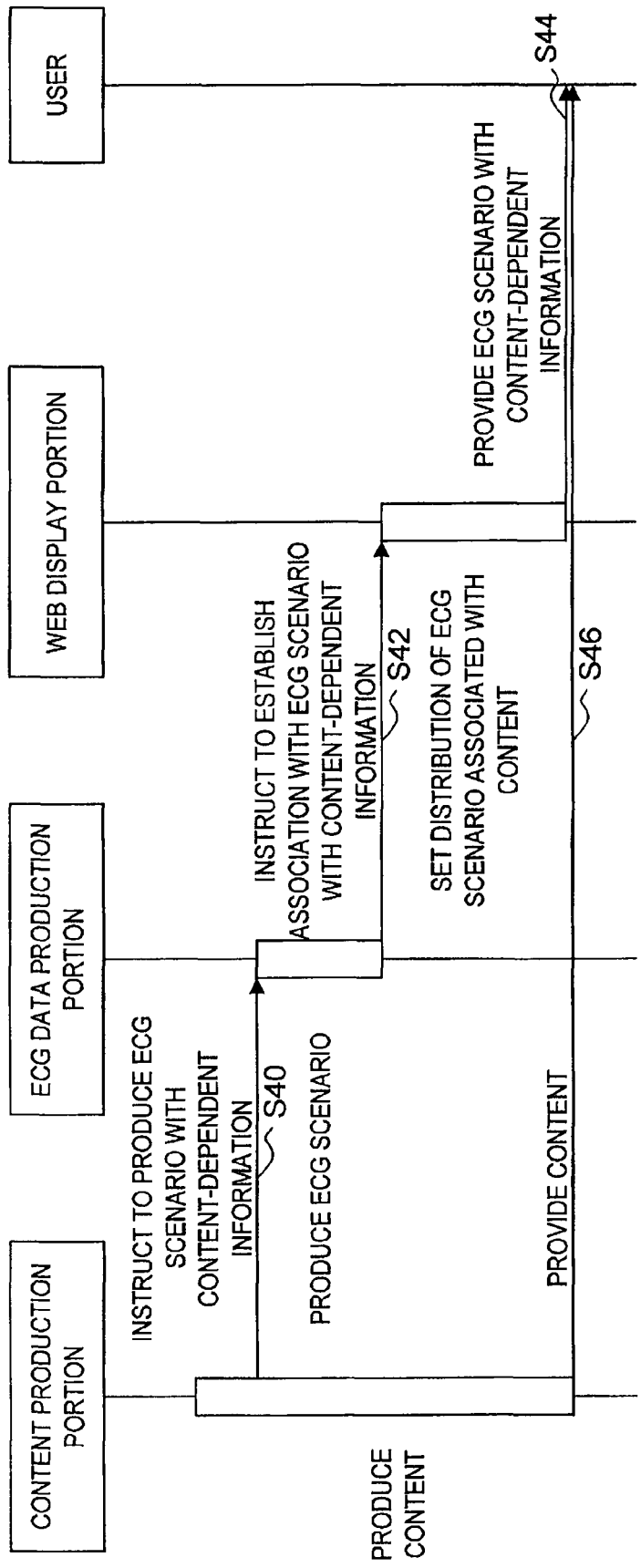

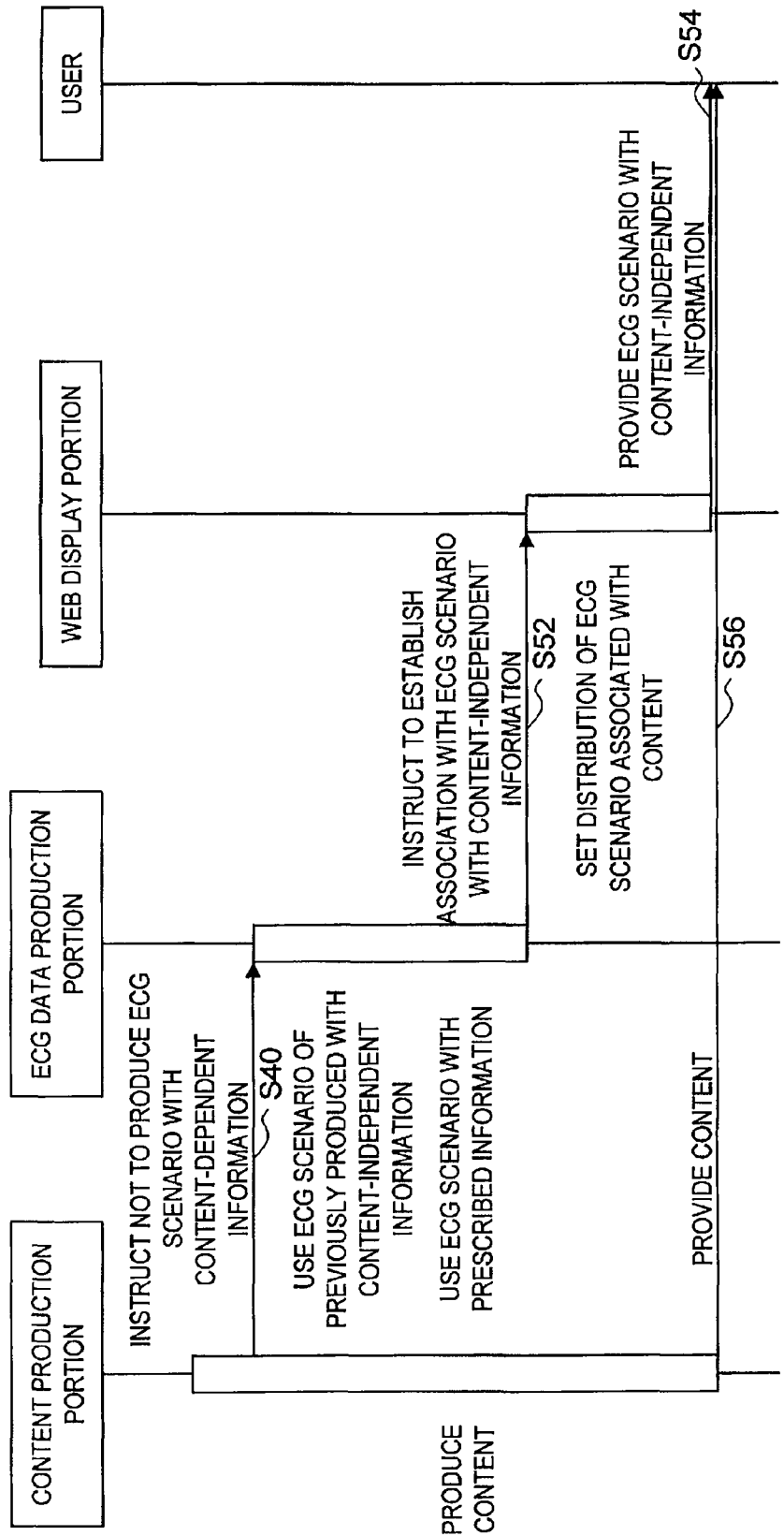

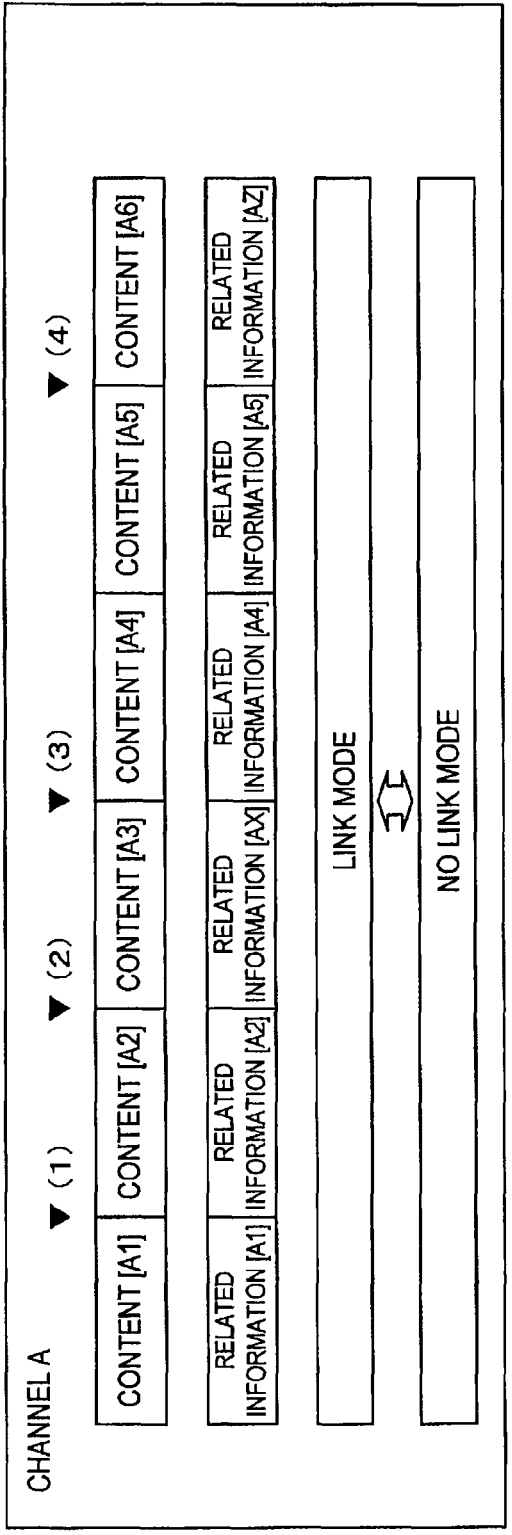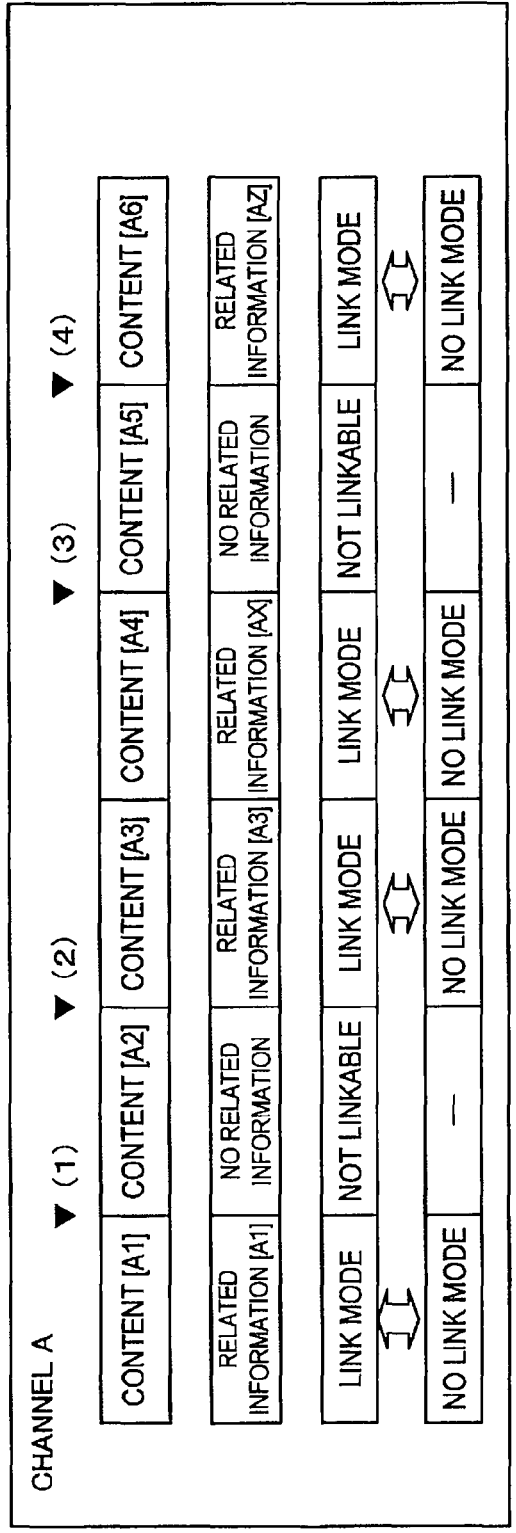

INFORMATION PROVIDING SYSTEM, INFORMATION RECEIVING APPARATUS, INFORMATION PROVIDING APPARATUS, INFORMATION PROVIDING METHOD AND PROGRAM

CROSS REFERENCES TO RELATED APPLICATIONS

The present invention contains subject matter related to Japanese Patent Application JP 2007-153233 filed in the Japan Patent Office on Jun. 8, 2007, the entire contents of which being incorporated herein by reference.

BACKGROUND OF THE INVENTION

1. Field of the Invention

The present invention relates to an information providing system, an information receiving apparatus, an information providing apparatus, an information providing method and program.

2. Description of the Related Art

Recently, a system in which content folders transmit general multimedia contents such as video, audio, image and text, and a user receives and displays (plays back) a content using an information receiving apparatus and views the content has been widespread. In such a system, related information which is associated with a content (which is also referred to hereinafter as content-related information) is transmitted as well as a content. A user thereby receives content-related information in addition to a content, so that the user can browse the related information of the currently viewed content while viewing the content.

For example, Japanese Patent Application Publication No. 2004-312223 discloses a broadcast program receiving apparatus which automatically provides content-related information such as details of a content after switching, to a user upon switching of contents (programs) in the same channel or switching of contents by a channel change.

SUMMARY OF THE INVENTION

However, because the content-related information is provided in conjunction with the currently viewed content, the provided related information is switched when the contents are switched. Further, some content-related information have such form that a plurality of pieces of information are displayed (played back) sequentially with the elapse of time. Thus, a user cannot browse the related information of the content separately from the currently viewed content or the related information of the content different from the currently viewed content, for example, and therefore a user cannot browse content-related information for sure.

On the other hand, a content folder cannot provide the related information of the content separately from the currently viewed content or the related information of the content different from the currently viewed content to a user, and therefore a content folder cannot provide content-related information for sure. Consequently, a content folder cannot efficiently promote a user to access the provided related information.

In light of the foregoing, it is desirable to provide information providing system, information receiving apparatus, information providing apparatus, information providing method and program which enable browsing of received related information with/without a link to a received content.

According to an embodiment of the present invention, there is provided an information receiving apparatus for receiving a content from a content folder, which is connected with an information providing apparatus for providing related information associated with the content through a communication network. The information receiving apparatus includes a first related information receiving portion to receive the related information associated with the content from the information providing apparatus, a mode selecting portion to select one from link mode and no link mode to specify a link condition between the received content and the received related information, a first related information request transmitting portion to transmit a related information request for requesting transmission of the related information together with content designation information designating the content to be received when the link condition is switched to the link mode and with content designation information designating the content after switching when the content to be received is switched in the link mode to the information providing apparatus, and not to transmit the related information request and the content designation information to the information providing apparatus when the no link mode is selected, and a display control portion to perform display control of the received content and the related information received from the information providing apparatus based on the content designation information and the related information request and display control of the selected link condition.

In this configuration, the link mode or the no link mode which specifies a link condition between the received content and the received related information is selected. If the link condition is switched to the link mode, the content designation information designating the content to be received and the related information request are transmitted to the information providing apparatus. If the content to be received is switched in the link mode, the content designation information designating the content after switching and the related information request are transmitted to the information providing apparatus. On the other hand, if the no link mode is selected, the content designation information and the related information request are not transmitted to the information providing apparatus. Then, the content which is received from the content folder and the related information which is received from the information providing apparatus based on the content designation information and the related information request are display-controlled, and the selected link condition is displayed. A user of the information receiving apparatus can thereby browse the received related information with or without a link to the received content by switching the link condition.

In the case of receiving a plurality of time-scheduled contents from the content folder, the information receiving apparatus may further include a scheduling information storage portion to store scheduling information of the content including information concerning switching of the content with elapse of time, and a second related information request transmitting portion to transmit the related information request and the content designation information designating the content after switching to the information providing apparatus based on the scheduling information when switching of the content to be received occurs with elapse of time in the link mode.

In this configuration, the scheduling information of the content including information concerning switching of the content with the elapse of time is stored and, based on the scheduling information, if the switching of the content to be received occurs with the elapse of time in the link mode, the content designation information designating the content after switching and the related information request are transmitted to the information providing apparatus. Further, based on the content designation information and the related information request, the related information which is associated with the content is received from the information providing apparatus. A user of the information receiving apparatus can thereby browse the related information of the content which is switched with the elapse of time with or without a link to the content after switching by switching the link condition.

Further, in the case of receiving a plurality of time-scheduled contents from the content folder, the information receiving apparatus may further include a link condition transmitting portion to transmit the selected link condition to the information providing apparatus, and a second related information receiving portion to receive the related information which is extracted to correspond to the content after switching by the information providing apparatus based on the scheduling information of the content including information concerning switching of the content with elapse of time and the link condition when switching of the content to be received occurs with elapse of time in the link mode.

In this configuration, the selected link condition is transmitted to the information providing apparatus, and if the switching of the content to be received occurs with the elapse of time in the link mode, the related information which is extracted by the information providing apparatus to correspond to the content after switching, based on the scheduling information of the content including information concerning switching of the content with the elapse of time and the link condition, is received. A user of the information receiving apparatus can thereby browse the related information of the content which is switched with the elapse of time with or without a link to the content after switching by switching the link condition.

The information receiving apparatus may further include a designation information transmitting portion to transmit the content designation information designating the content to be received to the information providing apparatus, and a verification information receiving portion to receive verification information for verifying presence or absence of the related information stored in association with the content based on the content designation information from the information providing apparatus, and the display control portion may perform display control of the received verification information.

In this configuration, the content designation information designating the content to be received is transmitted to the information providing apparatus, and based on the content designation information, the verification information for verifying the presence or absence of the related information which is stored in association with the content is received and displayed. A user of the information receiving apparatus can thereby easily check the presence or absence of the related information which is associated with the received content.

The related information may include one or more scenario information in which a plurality of pieces of information that are associated with the content are formed into a scenario so as to be sequentially displayed.

In this configuration, because the related information includes one or more pieces of scenario information which has a scenario form so that a plurality of pieces of information that are associated with the content are sequentially displayed, a user of the information receiving apparatus can efficiently browse the information that is associated with the content with high visibility.

Further, the related information may include scenario information in which set information that includes a combination of content information associated with the content and service provision information associated with the content information or includes the content information are formed into a scenario.

In this configuration, because the content information and the service provision information which are contained in the scenario information are sequentially displayed, a user of the information receiving apparatus can easily browse the information which is associated with the content.

Further, the related information may include content-dependent information which is dependent on the associated content or content-independent information which is not dependent on the associated content.

In this configuration, because the content-dependent information or the content-independent information is received as related information, a user of the information receiving apparatus can browse the content-independent information even if the content-dependent information is not associated with the content.

The content may include a plurality of sub contents, and each sub content may be processed in the same way as the content.

In this configuration, because the content includes a plurality of sub contents, and each sub content is processed just like the content, a user of the information receiving apparatus can browse the received related information with or without a link to the received sub content by switching the link condition.

According to another embodiment of the present invention, there is provided an information providing apparatus for providing related information associated with a content, which is connected with an information receiving apparatus for receiving the content from a content folder through a communication network. When link mode or no link mode specifying a link condition between the received content and the received related information is selected by the information receiving apparatus, the information providing apparatus includes a related information storage portion to store the related information in association with the content, a first related information request receiving portion to receive a related information request for requesting transmission of the related information together with content designation information designating the content to be received by the information receiving apparatus when the link condition is switched to the link mode by the information receiving apparatus and with content designation information designating the content after switching when the content to be received by the information receiving apparatus is switched in the link mode from the information receiving apparatus, a first related information extracting portion to extract the related information corresponding to the content designated by the content designation information from the related information storage portion, and a related information transmitting portion to transmit the extracted related information to the information receiving apparatus.

In this configuration, if the link condition is switched to the link mode by the information receiving apparatus, the content designation information designating the content to be received by the information receiving apparatus and the related information request are received. If the content to be received by the information receiving apparatus is switched in the link mode, the content designation information designating the content after switching and the related information request are received. The related information is stored in association with the content, and based on the content designation information and the related information request, the related information which corresponds to the designated content is extracted from the related information storage portion and transmitted to the information receiving apparatus. The content folder thereby allows a user of the information receiving apparatus to browse the received related information with or without a link to the received content by switching the link condition.

In the case where a plurality of time-scheduled contents are received by the information receiving apparatus from the content folder, the information providing apparatus may further includes a second related information request receiving portion to receive the related information request and the content designation information designating the content after switching from the information receiving apparatus when switching of the content to be received by the information receiving apparatus occurs with elapse of time in the link mode.

In this configuration, if the switching of the content to be received by the information receiving apparatus occurs with the elapse of time in the link mode, the content designation information designating the content after switching and the related information request are received from the information receiving apparatus. Further, based on the content designation information and the related information request, the related information which corresponds to the designated content is extracted from the related information storage portion and transmitted to the information receiving apparatus. The content folder can thereby allow a user of the information receiving apparatus to browse the related information of the content which is switched with the elapse of time with or without a link to the content after switching by switching the link condition.

Further, in the case where a plurality of time-scheduled contents are received by the information receiving apparatus from the content folder, the information providing apparatus may further include a scheduling information storage portion to store scheduling information of the content including information concerning switching of the content with elapse of time, a link condition receiving portion to receive the link condition selected by the information receiving apparatus from the information receiving apparatus, and a second related information extracting portion to extract the related information corresponding to the content after switching from the related information storage portion based on the scheduling information and the link condition when switching of the content to be received by the information receiving apparatus occurs with elapse of time in the link mode.

In this configuration, the scheduling information of the content including information concerning switching of the content with the elapse of time is stored, and the link condition selected by the information receiving apparatus is received. Then, based on the scheduling information and the link condition, if the switching of the content to be received by the information receiving apparatus occurs with the elapse of time in the link mode, the related information which corresponds to the content after switching is extracted from the related information storage portion and transmitted to the information receiving apparatus. The content folder can thereby allow a user of the information receiving apparatus to browse the related information of the content which is switched with the elapse of time with or without a link to the content after switching by switching the link condition.

The information providing apparatus may further include a designation information receiving portion to receive the content designation information designating the content to be received by the information receiving apparatus from the information receiving apparatus, and a verification information transmitting portion to transmit verification information verifying presence or absence of the related information stored in association with the content based on the content designation information to the information receiving apparatus.

In this configuration, the content designation information designating the content to be received by the information receiving apparatus is received from the information receiving apparatus, and the verification information verifying the presence or absence of the related information which is stored in association with the content based on the content designation information is transmitted to the information receiving apparatus. The content folder can thereby allow a user of the information receiving apparatus to easily check the presence or absence of the related information which is associated with the received content.

The related information may include one or more scenario information in which a plurality of pieces of information that are associated with the content are formed into a scenario so as to be sequentially displayed.

In this configuration, because the related information includes one or more pieces of scenario information which has a scenario form so that a plurality of pieces of information that are associated with the content are sequentially displayed, the content folder can allow a user of the information receiving apparatus to efficiently browse the information associated with the content with high visibility.

Further, the related information may include scenario information in which set information that includes a combination of content information associated with the content and service provision information associated with the content information or includes the content information are formed into a scenario.

In this configuration, because the content information and the service provision information which are contained in the scenario information are sequentially displayed, the content folder can effectively allow a user of the information receiving apparatus to browse the information for prompting the selection of the content or the use of services.

Further, the related information may include content-dependent information which is dependent on the associated content or content-independent information which is not dependent on the associated content.

In this configuration, because the content-dependent information or the content-independent information is received as related information, the content folder can efficiently allow a user of the information receiving apparatus to browse the content-independent information which contains information for prompting the selection of the content or the use of services even if the content-dependent information is not associated with the content.

The content may include a plurality of sub contents, and each sub content may be processed in the same way as the content.

In this configuration, because the content includes a plurality of sub contents, and each sub content is processed just like the content, the content folder can allow a user of the information receiving apparatus to browse the received related information with or without a link to the received sub content by switching the link condition.

According to another embodiment of the present invention, there is provided an information providing system where an information receiving apparatus for receiving a content from a content folder and an information providing apparatus for providing related information associated with the content are connected through a communication network. In the information providing system, the information receiving system includes a related information receiving portion to receive the related information associated with the content from the information providing apparatus, a mode selecting portion to select one from link mode and no link mode to specify a link condition between the received content and the received related information, a related information request transmitting portion to transmit a related information request for requesting transmission of the related information together with content designation information designating the content to be received when the link condition is switched to the link mode and with content designation information designating the content after switching when the content to be received is switched in the link mode to the information providing apparatus, and not to transmit the related information request and the content designation information to the information providing apparatus when the no link mode is selected, and a display control portion to perform display control of the received content and the received related information and display control of the selected link condition. The information providing apparatus includes a related information storage portion to store the related information in association with the content, a related information request receiving portion to receive the content designation information and the related information request from the information receiving apparatus, a related information extracting portion to extract the related information corresponding to the designated content based on the content designation information, and a related information transmitting portion to transmit the extracted related information to the information receiving apparatus.

In this configuration, in the information receiving apparatus, the link mode or the no link mode which specifies a link condition between the received content and the received related information is selected. If the link condition is switched to the link mode, the content designation information designating the content to be received and the related information request are transmitted to the information providing apparatus. If the content to be received is switched in the link mode, the content designation information designating the content after switching and the related information request are transmitted to the information providing apparatus. On the other hand, if the no link mode is selected, the content designation information and the related information request are not transmitted to the information providing apparatus. In the information providing apparatus, the related information is stored in association with the content, and based on the content designation information and the related information request, the related information which corresponds to the designated content is extracted and transmitted to the information receiving apparatus. Then, in the information receiving apparatus, the content which is received from the content folder and the related information which is received from the information providing apparatus are display-controlled, and the selected link condition is displayed.

Therefore, if the link condition is switched to the link mode or when the received content is switched in the link mode, a user of the information receiving apparatus can browse the received related information with a link to the received content according to the switching of the contents. On the other hand, if the no link mode is selected, a user of the information receiving apparatus can browse the received related information without a link to the received content regardless of the switching of the contents. Consequently, a user can easily switch between passive browsing and active browsing of the related information by switching the link condition. Further, a content folder can provide the related information on its own when the link mode is selected.

According to another embodiment of the present invention, there is provided a information providing method which is applied to an information providing system where an information receiving apparatus for receiving a content from a content folder and an information providing apparatus for providing related information associated with the content are connected through a communication network. The information providing method includes the steps of selecting a mode from link mode and no link mode to specify a link condition between the received content and the received related information by the information receiving apparatus, transmitting a related information request for requesting transmission of the related information together with content designation information designating the content to be received when the link condition is switched to the link mode and with content designation information designating the content after switching when the content to be received is switched in the link mode to the information providing apparatus, and not transmitting the related information request and the content designation information to the information providing apparatus when the no link mode is selected, receiving the related information request and the content designation information from the information receiving apparatus, extracting the related information corresponding to the designated content from the related information stored in association with the content based on the content designation information and transmitting the extracted related information to the information receiving apparatus, receiving the extracted related information from the information providing apparatus, and performing display control of the received content and the received related information and displaying the selected link condition.

In this method, in the information receiving apparatus, the link mode or the no link mode which specifies a link condition between the received content and the received related information is selected. If the link condition is switched to the link mode, the content designation information designating the content to be received and the related information request are transmitted to the information providing apparatus. If the content to be received is switched in the link mode, the content designation information designating the content after switching and the related information request are transmitted to the information providing apparatus. On the other hand, if the no link mode is selected, the content designation information and the related information request are not transmitted to the information providing apparatus. In the information providing apparatus, the related information is stored in association with the content, and based on the content designation information and the related information request, the related information which corresponds to the designated content is extracted from the stored related information and transmitted to the information receiving apparatus. Then, in the information receiving apparatus, the content which is received from the content folder, the related information which is received from the information providing apparatus and the selected link condition are displayed.

Therefore, a user of the information receiving apparatus can browse the received related information with or without a link to the received content by switching the link condition. On the other hand, the content folder can allow a user of the information receiving apparatus to browse the received related information with or without a link to the received content by switching the link condition.

According to another embodiment of the present invention, there is provided a program for causing a computer to function as the information receiving apparatus according to the above-described embodiment of the present invention. A user of the information receiving apparatus can thereby browse the received related information with or without a link to the received content by switching the link condition.

According to another embodiment of the present invention, there is provided a program for causing a computer to function as the information providing apparatus according to the above-described embodiment of the present invention. The content folder can thereby allow a user of the information receiving apparatus to browse the received related information with or without a link to the received content by switching the link condition.

According to the embodiments of the present invention described above, it is possible to provide an information providing system, an information receiving apparatus, an information providing apparatus, an information providing method and a program which enable browsing of received related information with/without a link to a received content.

BRIEF DESCRIPTION OF THE DRAWINGS

FIG. 3 is an explanatory view conceptually showing an exemplary configuration of a broadcast receiving terminal which is included in an information providing system.

FIG. 4 is an explanatory view conceptually showing a functional configuration of a broadcast receiving terminal.

FIG. 5A is a block diagram showing main elements of a broadcast receiving terminal which is included in an information providing system.

FIG. 5B is a block diagram showing main elements of an ECG server which is included in an information providing system.

FIG. 6B is a block diagram showing main elements of an ECG server which is included in an information providing system.

FIG. 7 is an explanatory view showing an exemplary structure of ECG data which is contained in an ECG scenario.

FIG. 9A is an explanatory view showing an example of ECG data which is contained in an ECG scenario.

FIG. 9B is an explanatory view showing an example of ECG data which is contained in an ECG scenario.

FIG. 10A is an explanatory view showing an example of ECG data which is contained in an ECG scenario.

FIG. 10B is an explanatory view showing an example of ECG data which is contained in an ECG scenario.

FIG. 10C is an explanatory view showing an example of ECG data which is contained in an ECG scenario.

FIG. 11 is a flowchart showing a process flow in the execution of related information.

FIG. 17A is a sequence chart showing a flow from production to provision of a content and related information.

FIG. 17B is a sequence chart showing a flow from production to provision of a content and related information.

FIG. 21A is an explanatory view showing a transition pattern of a content and related information in response to mode switching when a content includes a plurality of time-scheduled contents.

FIG. 21B is an explanatory view showing a transition pattern of a content and related information in response to mode switching when a content includes a plurality of time-scheduled contents.

DETAILED DESCRIPTION OF THE PREFERRED EMBODIMENTS

Figure 1:
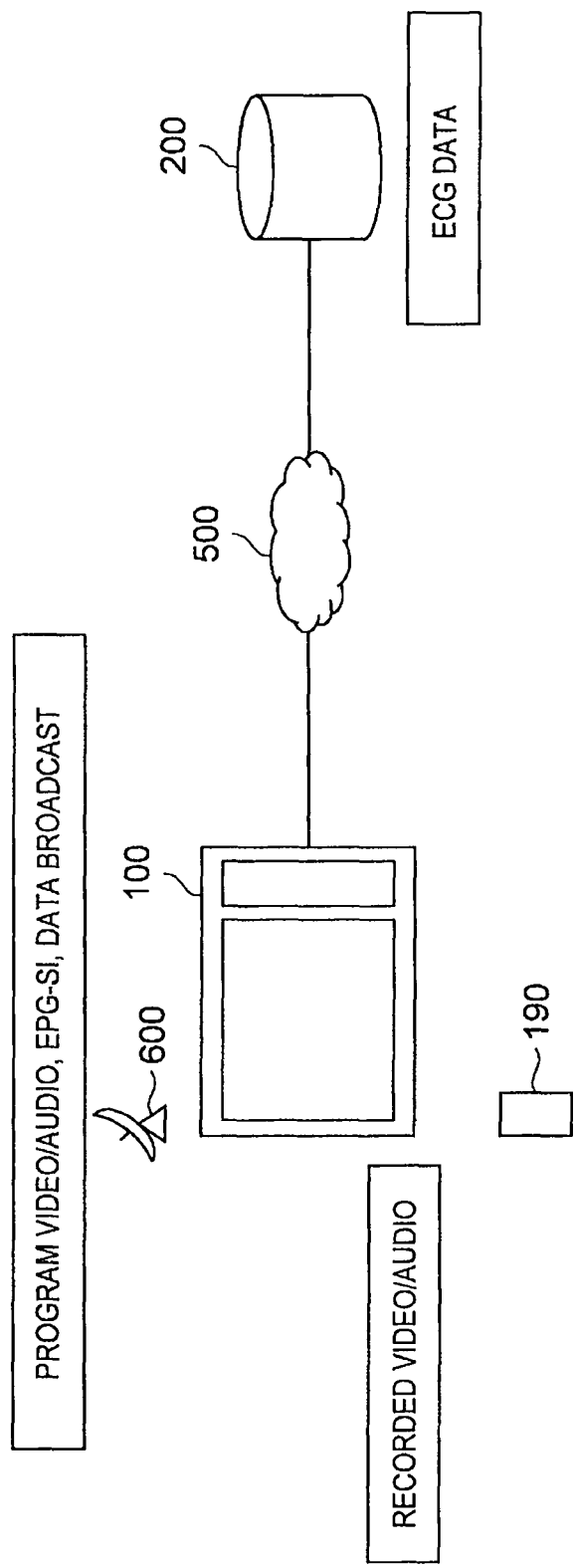
FIG. 1 is an explanatory view conceptually showing an overall configuration of an information providing system according to a first embodiment of the present invention.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

First Embodiment

As a first embodiment of the present invention, a case of receiving a broadcast program as a content from a content folder is described hereinafter.

Overall Configuration of an Information Providing System

FIG. 1 is an explanatory view conceptually showing an overall configuration of an information providing system according to the first embodiment of the present invention. Referring to FIG. 1, the information providing system includes a broadcast receiving terminal 100 (information receiving apparatus) of a user and an electronic content guide (ECG) server 200 (information providing apparatus) which is connected to the broadcast receiving terminal 100 through a communication network 500.

The broadcast receiving terminal 100 receives video/audio information, data broadcast information and electronic program guide-service information (EPG-SI) which are related to the currently broadcast program through a receiving antenna 600 or the like and provides the information to a user. In some cases, the broadcast receiving terminal 100 provides prerecorded video/audio information to a user. Further, the broadcast receiving terminal 100 according to this embodiment can receive information related to a program from the ECG server 200 which is connected through the communication network 500 and provide the received information to a user.

The ECG server 200 includes a storage portion which stores various information, a communication portion which transmits various information and so on as described later, and it operates a system which provides information related to a program to a user of the broadcast receiving terminal 100. The ECG server 200 registers and manages the information which is related to a program as ECG data and transmits the ECG data which is related to a program to the broadcast receiving terminal 100 to thereby provide the information to a user of the broadcast receiving terminal 100.

A user of the broadcast receiving terminal 100 can select the provided information which is available for viewing or browsing (receiving) such as video/audio information, data broadcast information, EPG-SI information and ECG data that are related to a program using a remote control 190 for the broadcast receiving terminal 100, for example. On a display screen of the broadcast receiving terminal 100, video information and ECG data related to a program, for example, are respectively displayed on the left and right sides of the display screen in the state where the ECG service provision is active.

Figure 2:
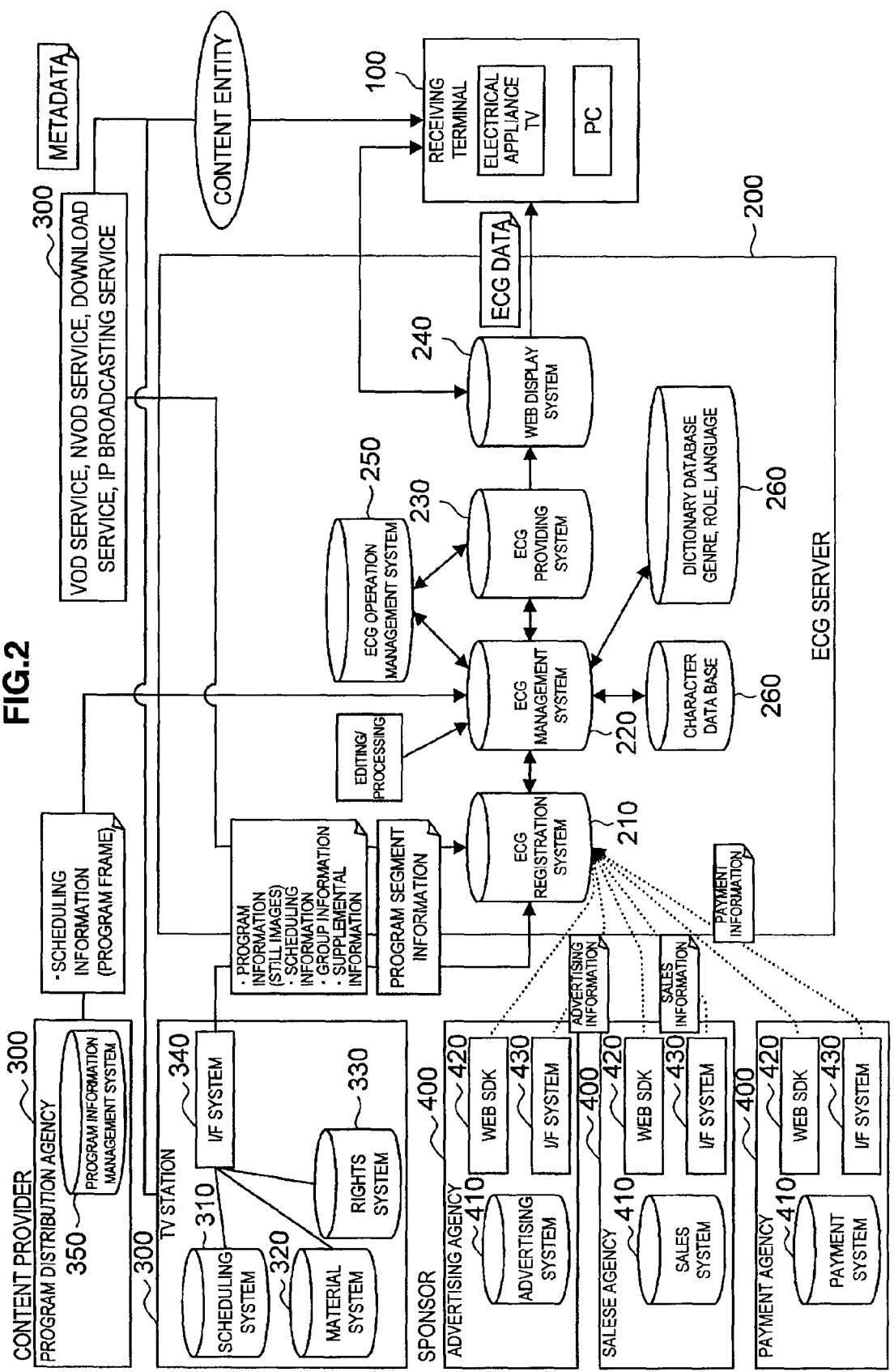
FIG. 2 is an explanatory view showing an exemplary model of an overall configuration of an information providing system.

FIG. 2 is an explanatory view showing an exemplary model of an overall configuration of an information providing system. Referring to FIG. 2, the information providing system includes a content folder 300, a sponsor 400, a broadcast receiving terminal 100 and an ECG server 200.

The content folder 300 corresponds a content provider which provides information related to a program together with video/audio information, data broadcast information and EPG-SI information related to a program. The content folder 300 may include a TV station, a data broadcast station and a program distribution agency, for example. The information related to a program includes program information (including still image information), scheduling information, group information, supplemental information, program segment information and so on (which are collectively referred to hereinafter as program information).

The TV station operates a scheduling system 310, a material system 320, a right system 330 and so on which manage program information that is related to a broadcast program. The data broadcast station operates a program information management system which manages program information related to a provided program that is provided by video-on-demand (VOD), near video-on-demand (NVOD), download, IP broadcasting services or the like. The program distribution agency operates a program information management system 350 which manages program information (scheduling information) related to a distributed program. The content folder 300 provides video/audio information and so on that is related to a program to a user of the broadcast receiving terminal 100 and also provides program information and detail information, which is described later, that is related to a program to the ECG server 200 through an input/output (I/F) system 340 or the like. The program information which is provided from the content folder 300 is provided to a user of the broadcast receiving terminal 100 through the ECG server 200.

The sponsor 400 may include an advertising agency, a sales agency, a payment agency and so on which provide advertising, sales, payment services and so on. In some cases, it may also include a content folder which provides video/audio information that is related to a program. The sponsor 400 operates a different kind of information processing system 410 according to business type such as advertising, sales or payment system, a Web software development kit (SDK) 420, an I/F system 430 and so on.

The sponsor 400 provides advertising information and sales information which introduce products or services that are sold or provided by an advertiser of the sponsor 400 or the sponsor 400, for example. If the sponsor 400 is a payment agency, the sponsor 400 provides payment information in the processing of product purchase based on sales information. If the sponsor 400 is a content folder, the sponsor 400 provides program information which introduces a content such as a program that is provided or distributed by the sponsor 400. The advertising information, sales information, payment information, program information and so on which are provided by the sponsor 400 are provided as service provision information that is related to a program to a user of the broadcast receiving terminal 100 through the ECG server 200.

As described above, the broadcast receiving terminal 100 receives video/audio information or the like that is related to a program from the content folder 300, and also receives ECG data such as program information and service provision information that is related to a program from the ECG server 200.

Configuration of Information Providing Apparatus

The ECG server 200 (information providing apparatus) is operated by an information service provider or the like which produces, manages and provides information related to a program as ECG data. The ECG service provider 200 includes an ECG registration system 210, an ECG management system 220, an ECG providing system 230, a Web display system 240, an ECG operation management system 250, databases 260 and so on.

The ECG registration system 210 registers information that is related to a program (program information, service provision information etc.) which is provided from the content folder 300 and the sponsor 400. The databases 260 include a character database and a dictionary database, for example, and store detail information concerning program information such as program scheduling, cast, genre and music and event related to a program.

The ECG management system 220 manages the program information and the service provision information which are registered in the ECG registration system 210 and the detail information which is stored in the databases 260. The ECG management system 220 performs various editing and processing on the program information, the service provision information and the detail information. Particularly, the ECG management system 220 produces information related to a program as ECG data and establishes associations or set priorities among the ECG data, thereby editing a plurality of pieces of ECG data into an ECG scenario, as described in detail later.

Further, the ECG management system 220 produces program listing information which contains scheduling information of a plurality of programs as ECG data by performing editing and processing on the program information. The information provided as the program listing information which is produced as ECG data is not limited as electronic program guide (EPG) information, and the program listing information may contain information concerning time sections for features constituting a program and information such as still images contained in program information, for example, in addition to information concerning a broadcast time and an overview of a program. The program listing information is in conjunction with the currently broadcast program, and it is updated in real time according to a program change.

The ECG providing system 230 provides the ECG data such as an ECG scenario and program listing information which are managed by the ECG management system 220 to a user of the broadcast receiving terminal 100 through the Web display system 240. In response to a request from the broadcast receiving terminal 100, the Web display system 240 provides the ECG data which is provided from the ECG providing system 230 to the broadcast receiving terminal 100 through the communication network 500.

The ECG operation management system 250 controls the ECG management system 220 and the ECG providing system 230, thereby managing the entire system operation of the ECG server 200.

In the ECG server 200, the ECG registration system 210, the ECG management system 220 and the databases 260, for example, serve as a related information storage portion 270, a scheduling information storage portion 278 and so on, which are described later. The ECG providing system 230 serves as related information extracting portions (first and second related information extracting portions 274 and 282) and so on, which are also described later. The Web display system 240 serves as related information request receiving portions (first and second related information request receiving portions 272 and 288), a related information transmitting portion 276, a link condition receiving portion 280, a designation information receiving portion 284, a verification information transmitting portion 286 and so on, which are also described later. Such a configuration is illustrated by an example only, and the configuration of the ECG server 200 is not limited to the above-described configuration.

Configuration of Broadcast Receiving Apparatus

FIG. 3 is an explanatory view conceptually showing an exemplary configuration of a broadcast receiving terminal (information receiving apparatus) which is included in an information providing system. Referring to FIG. 3, the broadcast receiving terminal 100 receives programs which are broadcasted through various transmission lines, such as analog terrestrial broadcasting, digital terrestrial broadcasting, broadcast satellite (BS) analog broadcasting, BS digital broadcasting, communication satellite (CS) 124/128-degree broadcasting, CS 110-degree broadcasting, digital common antenna television (CATV) broadcasting, analog CATV broadcasting and optical fiber broadcasting, for example, through the receiving antenna 600 or the like.

The broadcast receiving terminal 100 may be a broadcast terminal such as a TV terminal, a portable terminal or a mobile terminal, a set top box (STB), a CATV terminal, an internet protocol television (IPTV) terminal, a personal video recorder (PVR), a personal computer (PC), a cellular phone or a personal digital assistant (PDA), for example. The broadcast receiving terminal 100 is capable of communication through the communication network 500 including such as an optical fiber, asymmetric digital subscriber line (ADSL) and a telephone modem.

The broadcast receiving terminal 100 may be operated using a remote control, a keyboard, a mouse and so on. A remote control 190 for the broadcast receiving terminal 100 may include a channel selection button for selecting the channel of a program to be received, up, down, left and right buttons, an enter button, a return button, and so on, for example. A user of the broadcast receiving terminal 100 can directly select the channel of the program which is currently broadcasted by operating the channel selection button. Alternatively, a user can select the channel of a program by selecting a desired program based on program listing information by operating the up, down, left and right buttons or the like and determining the selection of the program by operating the enter button. The up, down, left and right buttons, the enter button and the return button may be operated in the same manner for the selection and determination of various information, besides the program channel selection.

The remote control 190 may further include an EPG-SI information button, a data broadcast information button, an ECG service button, a mode selection button (mode selecting portion 132) and so on, for example. A user of the broadcast receiving terminal 100 can access the EPG-SI information and the data broadcast information which are provided from the content folder 300 by operating the EPG-SI information button and the data broadcast information button, respectively. A user can also request the ECG server 200 to start or terminate the provision of an ECG service by operating the ECG service button. A user can also switch the selection between link mode and no link mode, which are described later, by operating the mode selection button.

Although the operation method using the remote control 190 is described above, the operation method using a keyboard, a mouse or an operating portion in the main body of the broadcast receiving terminal 100 is substantially the same as the operation method using the remote control 190 and a detailed description is omitted.

FIG. 4 is an explanatory view conceptually showing a functional configuration of the broadcast receiving terminal 100. Each functional block of the broadcast receiving terminal 100 is controlled by a computer system which includes CPU. A storage portion which is included in the broadcast receiving terminal 100 and/or a recording medium which is removable from the broadcast receiving terminal 100 stores a program for causing each functional block to be functioning.

Referring to FIG. 4, the broadcast receiving terminal 100 includes a broadcast processing portion 110, an ECG software processing portion 120, a display control portion 150 and a device control portion 160. The broadcast processing portion 110 includes a video/audio information receipt and playback function 112, a data broadcast receipt and playback function 114 and an EPG receipt and control function 116. The ECG software processing portion 120 includes an ECG data acquisition function 122, an ECG data browsing function 124 and an ECG data processing function 126.

The broadcast processing portion 110 receives video/audio information and data broadcast information related to a broadcast program from the content folder 300 through a broadcast receiving portion 170, performs necessary processing and displays (plays back) the information by the display control portion 150. The broadcast processing portion 110 also receives EPG information from the content folder 300 through the broadcast receiving portion 170 and performs necessary control such as display (playback) or operation of the EPG information. The ECG software processing portion 120 acquires information related to a program as ECG data from the ECG server 200 through a communication control portion 180, performs necessary processing and displays the information by the display control portion 150, thereby allowing a user to browse it. The device control portion 160 controls the processing operation of the broadcast processing portion 110 and the ECG software processing portion 120 through the operation of the remote control 190 by a user.

In the broadcast receiving terminal 100, the ECG software processing portion 120 serves, in conjunction with the communication control portion 180, as related information receiving portions (first and second related information receiving portions 130 and 148), related information request transmitting portions (first and second related information request transmitting portions 134 and 140), a scheduling information storage portion 138, a link condition transmitting portion 146, a designation information transmitting portion 142, a verification information receiving portion 144 and so on, which are described later. The display control portion 150 serves as a display control portion 136 or the like, which is also described later. Further, the remote control 190 serves as a mode selecting portion 132 or the like, which is also described later. Such a configuration is illustrated by an example only, and the configuration of the broadcast receiving terminal 100 is not limited to the above-described configuration.

Elements of Broadcast Receiving Terminal and ECG Server

Figure 6A:
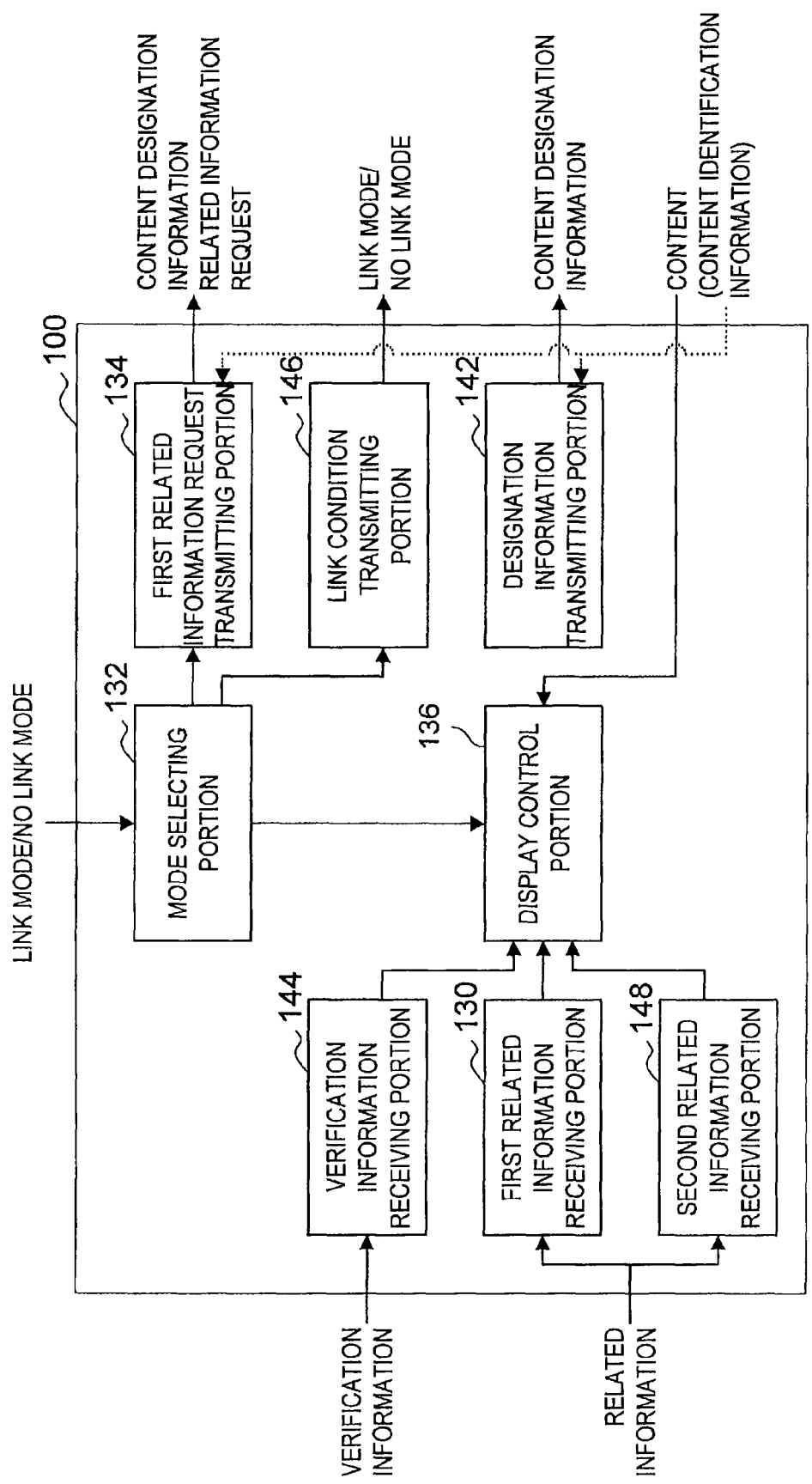
FIG. 6A is a block diagram showing main elements of a broadcast receiving terminal which is included in an information providing system.

FIGS. 5A, 5B, 6A and 6B are block diagrams showing the main elements of the broadcast receiving terminal and the ECG server which are included in the information providing system. FIGS. 5A and 5B show the case where the broadcast receiving terminal 100 (information receiving apparatus) responds to the switching of contents with the elapse of time, and FIGS. 6A and 6B show the case where the ECG server 200 (information providing apparatus) responds thereto.

The main elements of the information providing system shown in FIGS. 5A and 5B are described hereinafter. The broadcast receiving terminal 100 includes a first related information receiving portion 130, a mode selecting portion 132, a first related information request transmitting portion 134, a display control portion 136, a scheduling information storage portion 138, a second related information request transmitting portion 140, a designation information transmitting portion 142, and a verification information receiving portion 144.

The first related information receiving portion 130 receives related information which is associated with a program (content) from the ECG server 200. The mode selecting portion 132 selects link mode or no link mode which specifies a link condition between a received content and received related information. When the link condition is switched to the link mode, the first related information request transmitting portion 134 transmits content designation information which designates a content to be received together with a related information request which requests the transmission of related information to the ECG server 200. Further, when a content to be received is switched in the link mode, the first related information request transmitting portion 134 transmits content designation information which designates a content after switching together with a related information request to the ECG server 200. On the other hand, when the no link mode is selected, the first related information request transmitting portion 134 does not transmit content designation information and a related information request to the ECG server 200. The display control portion 136 performs display controls of the content which is received from the content folder 300 and the related information which is received from the ECG server 200 and displays a selected link condition. A content is received by the broadcast processing portion 110, which is described above, and input to the display control portion 136. Further, content identification information may be input to the first and second related information request transmitting portions 134 and 140 and the designation information transmitting portion 142 from an external device or an internal portion of the broadcast receiving terminal 100.

The scheduling information storage portion 138 stores scheduling information of contents which contains information concerning the switching of contents with the elapse of time. Scheduling information may be produced based on the information which is received by the above-described EPG receipt and control function 116 and the ECG data acquisition function 122 and stored in the scheduling information storage portion 138, for example. Based on the scheduling information, when the switching of contents to be received occurs with the elapse of time in the link mode, the second related information request transmitting portion 140 transmits content designation information which designates a content after switching together with a related information request to the ECG server 200.

The designation information transmitting portion 142 transmits content designation information which designates a content to be received to the ECG server 200. Based on the content designation information, the verification information receiving portion 144 receives verification information for verifying the presence or absence of the related information which is stored in association with the content from the ECG server 200.

The ECG server 200 shown in FIG. 5B includes a related information storage portion 270, a first related information request receiving portion 272, a first related information extracting portion 274, a related information transmitting portion 276, a second related information request receiving portion 288, a designation information receiving portion 284 and a verification information transmitting portion 286.

The related information storage portion 270 stores related information in association with a program (content). The first related information request receiving portion 272 receives content designation information which designates a content to be received by the broadcast receiving terminal 100 and a related information request which requests the transmission of related information from the broadcast receiving terminal 100. Based on the content designation information, the first related information extracting portion 274 extracts the related information which corresponds to the designated content from the related information storage portion 270. The related information transmitting portion 276 transmits the related information which is extracted by the first related information extracting portion 274 to the broadcast receiving terminal 100.

When the switching of contents to be received by the broadcast receiving terminal 100 occurs with the elapse of time in the link mode, the second related information request receiving portion 288 receives content designation information which designates a content after switching together with a related information request from the broadcast receiving terminal 100.

The designation information receiving portion 284 receives content designation information from the broadcast receiving terminal 100. Based on the received content designation information, the verification information transmitting portion 286 transmits verification information which verifies the presence or absence of the related information that is stored in association with the content in the related information storage portion 270 to the broadcast receiving terminal 100.

The main elements of the information providing system shown in FIGS. 6A and 6B are described hereinafter. The elements which are identical to the main elements of the information providing system shown in FIGS. 5A and 5B are not repeatedly described below. The broadcast receiving terminal 100 shown in FIG. 6A includes the first related information receiving portion 130, the mode selecting portion 132, the first related information request transmitting portion 134, the display control portion 136, a link condition transmitting portion 146, a second related information receiving portion 148, the designation information transmitting portion 142 and the verification information receiving portion 144. Thus, the broadcast receiving terminal 100 shown in FIG. 6A includes the link condition transmitting portion 146 and the second related information receiving portion 148 instead of the scheduling information storage portion 138 and the second related information request transmitting portion 140.

The link condition transmitting portion 146 transmits the selected link condition to the ECG server 200. When the switching of contents to be received occurs with the elapse of time in the link mode, the second related information receiving portion 148 receives the related information which is extracted to correspond to a content after switching from the ECG server 200 based on the scheduling information of the content which contains the information concerning the switching of contents with the elapse of time and the link condition.

The ECG server 200 shown in FIG. 6B includes the related information storage portion 270, the first related information request receiving portion 272, the first related information extracting portion 274, the related information transmitting portion 276, a scheduling information storage portion 278, a link condition receiving portion 280, a second related information extracting portion 282, the designation information receiving portion 284 and the verification information transmitting portion 286. Thus, the ECG server 200 shown in FIG. 6B includes the scheduling information storage portion 278, the link condition receiving portion 280 and the second related information extracting portion 282 instead of the second related information request receiving portion 288.

The scheduling information storage portion 278 stores the scheduling information of the content which contains the information concerning the switching of contents with the elapse of time. The link condition receiving portion 280 receives the link condition which is selected by the broadcast receiving terminal 100 from the broadcast receiving terminal 100. When the switching of contents to be received by the broadcast receiving terminal 100 occurs with the elapse of time in the link mode, the second related information extracting portion 282 extracts the related information which corresponds to a content after switching from the related information storage portion 270 based on the scheduling information and the link condition.

Structure of ECG Scenario

FIG. 7 is an explanatory view showing an exemplary structure of ECG data which is contained in an ECG scenario. Referring to FIG. 7, an ECG scenario contains program information related to a program, service provision information related to program information, and association information which establishes association among a program, program information and service provision information. An ECG scenario is a collection of ECG sets, each set being a combination of each program information and service provision information which is associated with each program information. The ECG set may be composed of program information only, without including service provision information. Further, priorities may be set to the ECG sets which form an ECG scenario and to the service provision information which form each ECG set.

In the structure of the ECG scenario which is illustrated in FIG. 7, the program information which are associated with the program B10, i.e. "broadcast schedule" 22, "performer C" 32, "performer A" 42, "performer B" 52, "music B" 62 and "event" 72, are classified into categories of scheduling, cast, music and event as appropriate. Further, the service provision information is associated with each program information. For example, the service provision information "DVD" 34, "book" 36 and "goods" 38 are associated with the program information "performer C" 32. Thus, one ECG set 30 which includes the "performer C" 32, the service provision information "DVD" 34, "book" 36 and "goods" 38 is formed, and further an ECG scenario which is a collection of the ECG sets 20, 30, 40, 50, 60 and 70 that respectively correspond to the program information is formed.

Priorities "(1)", "(2)", "(6)", "(3)", "(4)" and "(5)" are respectively set to the ECG sets 20, 30, 40, 50, 60 and 70 which respectively correspond to the program information "broadcast schedule" 22, "performer C" 32, "performer A" 42, "performer B" 52, "music B" 62 and "event" 72. Further, priorities are also set to the service provision information according to the priorities of the ECG sets. For example, priorities "3)", "4)", "5)" and "6)" are respectively set to the program information "performer C" 32 and the service provision information "DVD" 34, "book" 36 and "goods" 38 which are associated with the program information "performer C" 32. Accordingly, in the execution of the ECG scenario, after the program information "performer C" 32 is displayed, the service provision information "DVD" 34, "book" 36 and "goods" 38 which are associated with the program information "performer C" 32 are sequentially displayed, and then the program information "performer B" 52 with the priority "7)" is displayed after that.

Figure 8:
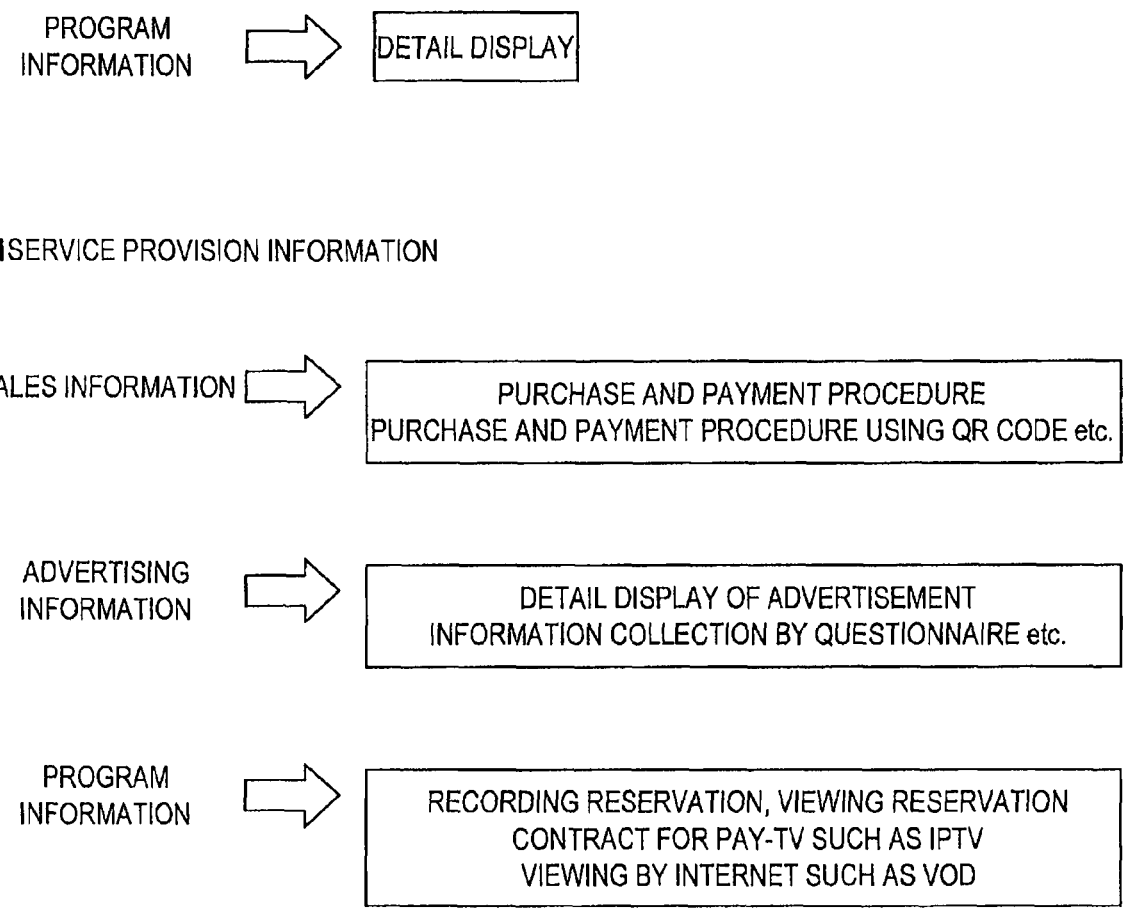
FIG. 8 is an explanatory view showing an example of a peripheral configuration of an ECG scenario.

FIG. 8 is an explanatory view showing an example of a peripheral configuration of an ECG scenario. Referring to FIG. 8, the ECG scenario contains program information and service provision information, which are associated with detail information concerning the program information and detail information concerning the service provision information.

The detail information concerning program information includes detail information about program scheduling and cast, detail information about music and event related to a program and so on, for example. The detail information concerning service provision information includes, if it is the service provision information about sales, information about purchase and payment procedure, for example, and it may further provide information such as QR (Quick Response) code for performing the purchase and payment procedure. If it is the service provision information about advertising information, the detail information concerning the service provision information includes detail information of advertisement, for example, and it may provide information such as questionnaire information for collecting information. If it is the service provision information about program information, the detail information concerning the service provision information includes information about recording reservation and viewing reservation, for example, and it may provide information for Pay-TV contract and VOD viewing.

The detail information concerning program information is provided from the ECG server 200 to the broadcast receiving terminal 100 in response to a request of a user which is made while the corresponding program information is displayed. The detail information concerning service provision information is provided from the sponsor 400 to the broadcast receiving terminal 100 through the ECG server 200 in response to a request of a user which is made while the corresponding service provision information is displayed. The detail information concerning service provision information may include information about processing such as purchase and payment procedure, questionnaire, recording reservation and viewing reservation, for example, and prescribed processing is performed between a user of the broadcast receiving terminal 100 and the sponsor 400 based on the information.

Metadata of ECG Scenario

FIGS. 9A, 9B, 10A, 10B and 10C are explanatory views showing an example of ECG data which is contained in an ECG scenario. FIGS. 9A, 9B, 10A, 10B and 10C illustrate metadata of program information, service provision information, association information for establishing association among a program, program information and service provision information, an ECG set and an ECG scenario, respectively.

The metadata of program information shown in FIG. 9A contains descriptions of information such as program genre, keyword, cast and so on.

In the metadata shown in FIG. 9A, "P00001", "professional style", "documentary", "AAA AAA BBB BBB know-how impression" are described as an program ID, a program name, a genre and a keyword, respectively. Further, "2007/7/1", "13:00:00" and "15:00:00" are described as a start date, a start time and an end time of the program, respectively. Furthermore, three casts who appear on the program are described, and it is described for the cast with the person ID "1_1" that a name is "AAA AAA" and a birthplace is "Japan", for example. In addition, "AA1" and "L00001" are described as an association ID (relation ID) for the metadata and a reference ID list for association information of the program, respectively.

The metadata of service provision information shown in FIG. 9B contains descriptions of information such as a service provision information genre, a keyword, a maker, a price, a place to obtain detail information and so on.

In the metadata shown in FIG. 9B, "C00001", "product 1", "publication", "XXX YYY ZZZ", "zony", "100 yen" and "www.zony.co.jp" are described as a service provision information ID (content ID), a service provision information name, a genre, a keyword, a maker, a price, and a place to obtain detail information, respectively.

The metadata of association information for establishing association among a program, program information and service provision information shown in FIG. 10A contains descriptions of information such as genres of program information and service provision information to be associated with a program and so on.

In the metadata shown in FIG. 10A, "L00001", "HHH", "2007/1/1", "13:00:00", "2007/1/1" and "15:00:00" are described as a program association ID, a program association name, the start date and time and the end date and time of association, respectively. Further, "1", "P00001", and "shopping" are described as a program ID to be associated (link program ID), a program ID and a genre, respectively. Furthermore, three pieces of service provision information to be associated are described, and it is described for the service provision information with the service provision information ID to be associated (link content ID) "1" that a service provision information ID is "C00001" and a genre is "sport".

The metadata of an ECG set shown in FIG. 10B contains descriptions of information such as program information and service provision information which form an ECG set.

In the metadata of an ECG set shown in FIG. 10B, "es00001", "GGG", "2007/1/1", "13:00:00", "2007/1/1" and "15:00:00" are described as an ECG set ID, an ECG set name, and the start date and time and the end date and time of the ECG set, respectively. Further, five items which constitute the ECG set are described, and it is described for the item with the item ID (content id) "1" that a type is "program" and a program ID is "P00001".

The metadata of an ECG scenario shown in FIG. 10C contains descriptions of information of ECG sets which constitute the ECG scenario.

In the metadata of an ECG scenario shown in FIG. 10C, "sc00011", "GGG", "2007/1/1", "13:00:00", "2007/1/1" and "15:00:00" are described as an ECG scenario ID, an ECG scenario name, and the start date and time and the end date and time of the ECG scenario, respectively. Further, four ECG sets which form the ECG scenario are described, and it is described for the items with the item IDs (content id) "1" to "4" that the ECG set IDs are "es00001" to "es00004", respectively.

Process Flow of ECG Scenario

FIG. 11 is a flowchart showing a process flow in the execution of related information (ECG scenario). The process flow in the execution of an ECG scenario is described hereinafter with reference to FIG. 11. In the following description, the expression "display of a content and related information" includes the meaning "playback of a content and related information".

Prior to the execution of an ECG scenario, the provision of an ECG service is activated through the operation of the broadcast receiving terminal 100 by a user (S10). After the provision of an ECG service is activated, the ECG scenario which is associated with the program that is channel-selected by remote control operation is acquired from the ECG server 200 (S12). After the ECG scenario is acquired, the acquired ECG scenario is executed, and the program information and the service provision information which form the ECG scenario are sequentially displayed in units of ECG sets according to the priorities that are set thereto (S14). After the display of all the program information and the service provision information which form the ECG scenario is completed (S18), the display of the ECG scenario according to the priorities is repeated (S20).

If a user finds interested information in the displayed program information and service provision information, the user performs determination operation (S16). When the determination operation is performed, the display of the detail information concerning the program information and the service provision information or the processing for providing services concerning the service provision information are performed according to the program information and the service provision information which are displayed when the determination operation is performed (S22).

During the execution of an ECG scenario, if an interrupt event such as remote control operation not related to the execution of the ECG scenario or update/change of program listing information occurs (S24), the execution of the ECG scenario is terminated or suspended (S26), and the interrupt event is executed (S28).

Concept of Link/No Link Mode of Content and Related Information

Figure 12:
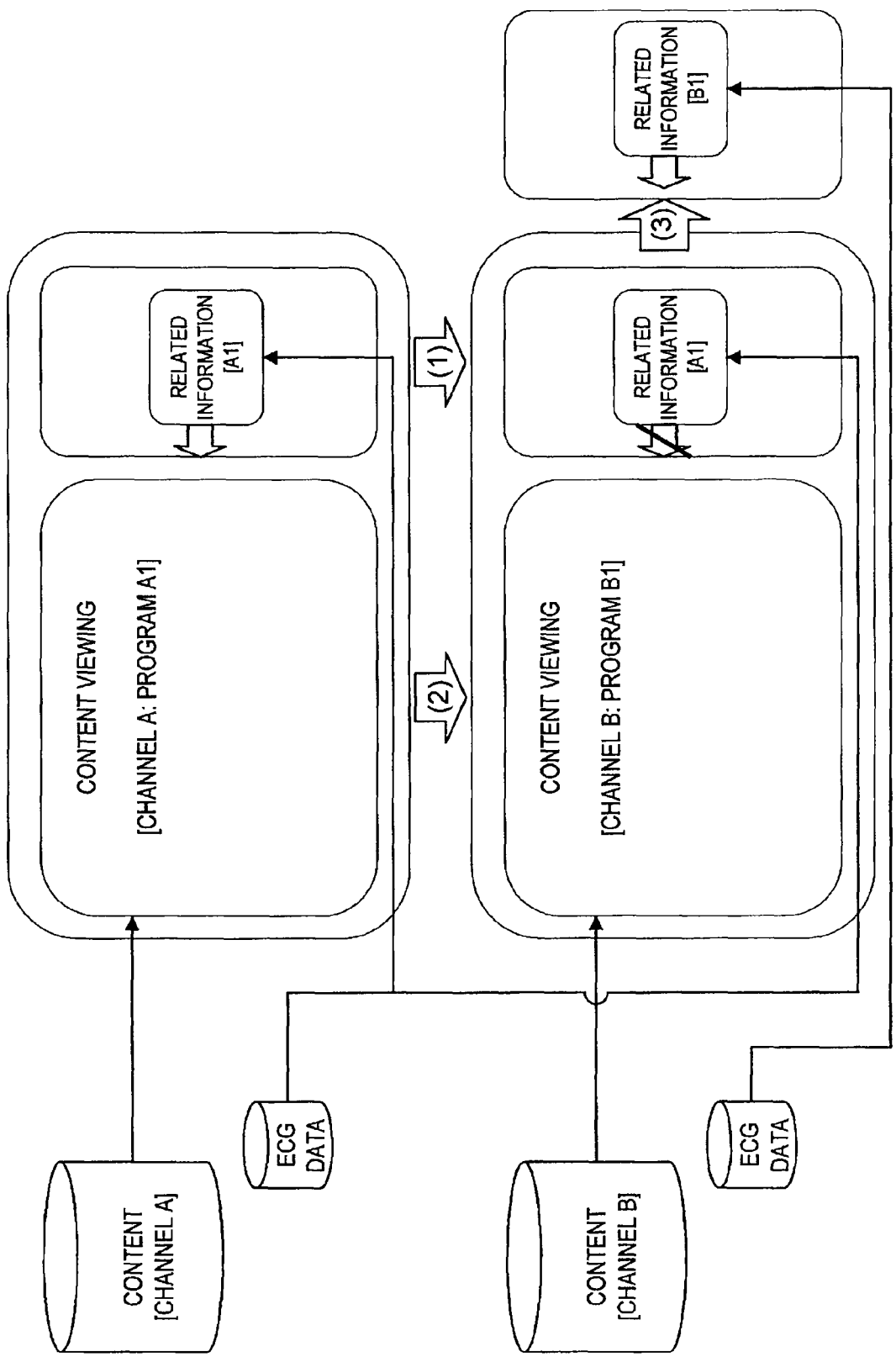
FIG. 12 is an explanatory view conceptually showing link/ no link mode of a content and related information.

FIG. 12 is an explanatory view conceptually showing the link/no link mode of a content and related information which are characteristic to the information providing system according to this embodiment. FIG. 12 illustrates the case where contents and related information which are related to channels A and B are provided.

As described in the foregoing, to the broadcast receiving terminal 100, the content such as video/audio information related to a program is provided from the content folder 300, and the related information (ECG scenario) such as program information and service provision information related to a program is provided from the ECG server 200. In the broadcast receiving terminal 100, a main area and a sub area are placed on the left side and the right side of a display screen, for example, and the currently viewed content and the related information are displayed in the main area and the sub area, respectively.

In the broadcast receiving terminal 100, a content (content A1) which is related to a program A1 in a channel A is viewed in the main area in the state where the link mode is selected. Thus, related information A1 of the content A1 is provided, and the related information A1 of the content A1 is displayed in the sub area while the content A1 is displayed in the main area. Further, an arrow icon which indicates that the link mode is selected is displayed between the main area and the sub area.

Next, when the no link mode is selected by the operation (1) of a user, the display of the icon is changed to indicate that the no link mode is selected by putting "/" on the arrow, for example. Then, in the no link mode, when a channel B is selected by the operation (2) of a user and the switching of contents occurs, the currently viewed content is switched from the content A1 to a program B1 (content B1) in the channel B.

Because it is in the no link mode, the provided related information is not switched when the viewed content is switched. Thus, the related information A1 of the content A1 is still displayed in the sub area while the content B1 is displayed in the main area.

Further, when the link mode is selected by the operation (3) of a user, the display of the icon is changed back to the original state which indicates the link mode. Because it is in the link mode, the provided related information is linked to the currently viewed content. Thus, related information B1 of the content B1 is now displayed in the sub area while the content B1 is displayed in the main area.

Display Pattern of Content and Related Information

FIGS. 13A, 13B, 13C, 14A and 14B are explanatory views conceptually showing the display patterns of a content and related information. FIGS. 13A, 13B and 13C and FIGS. 14A and 14B illustrate the display patterns when the link mode and the no link mode are selected, respectively. Thus, the icon which indicates the selection of the link mode or the no link mode is displayed between the main area and the sub area of each display screen.

Figure 13A:
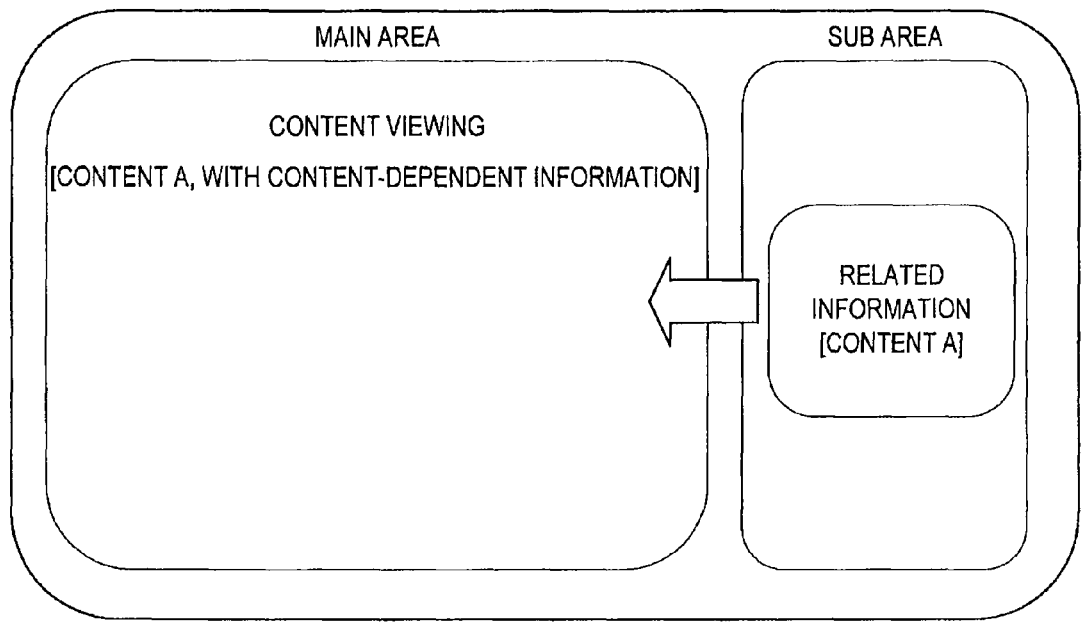
FIG. 13A is an explanatory view conceptually showing a display pattern of a content and related information.

Referring to FIG. 13A, the related information A of the content A is displayed in the sub area while the content A is viewed. As the related information A of the content A, content-dependent information which is dependent on the information of the content A is displayed. The content-dependent information is information which is directly related to the information of a content, and it may contain program information such as schedule, cast, genre, music and event which are related to the content and service provision information such as sales information, advertising information and program information which are associated with the program information.

Figure 13B:
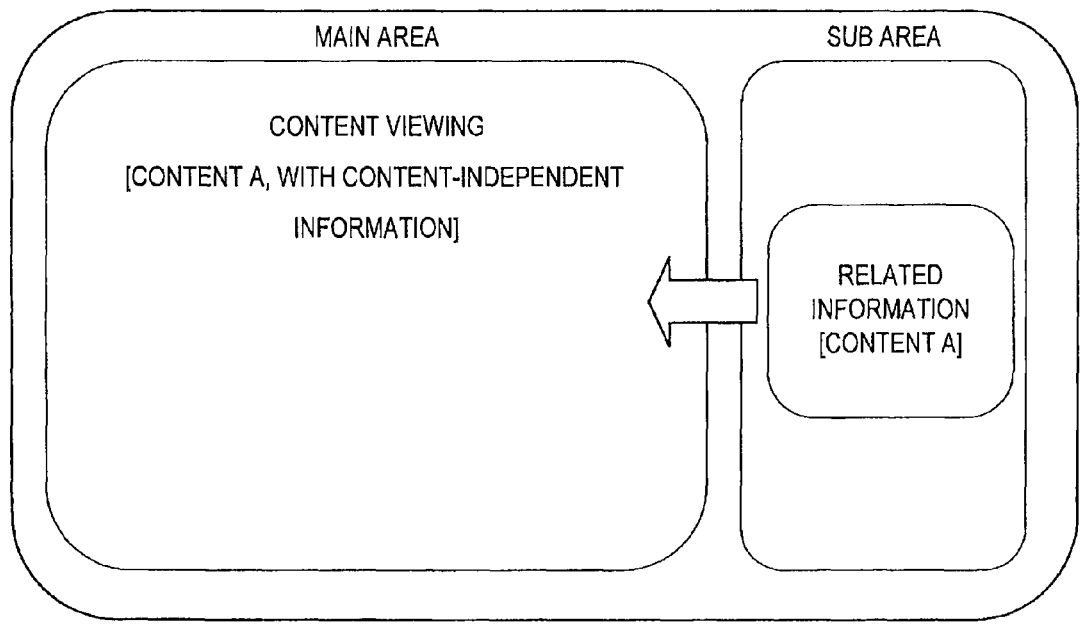
FIG. 13B is an explanatory view conceptually showing a display pattern of a content and related information.

Referring to FIG. 13B, the related information A of the content A is displayed in the sub area while the content A is viewed, just like the case of FIG. 13A. As the related information A of the content A, content-independent information which is independent of the information of the content A is displayed. The content-independent information is information which is not directly related to the information of a content, and it may contain information concerning a content of a program which is scheduled to be broadcasted, a content of VOD which does not depend on program scheduling and a content which is recommended by the content folder 300, information which is different from a content that is provided from the content folder 300, and so on.

Figure 13C:
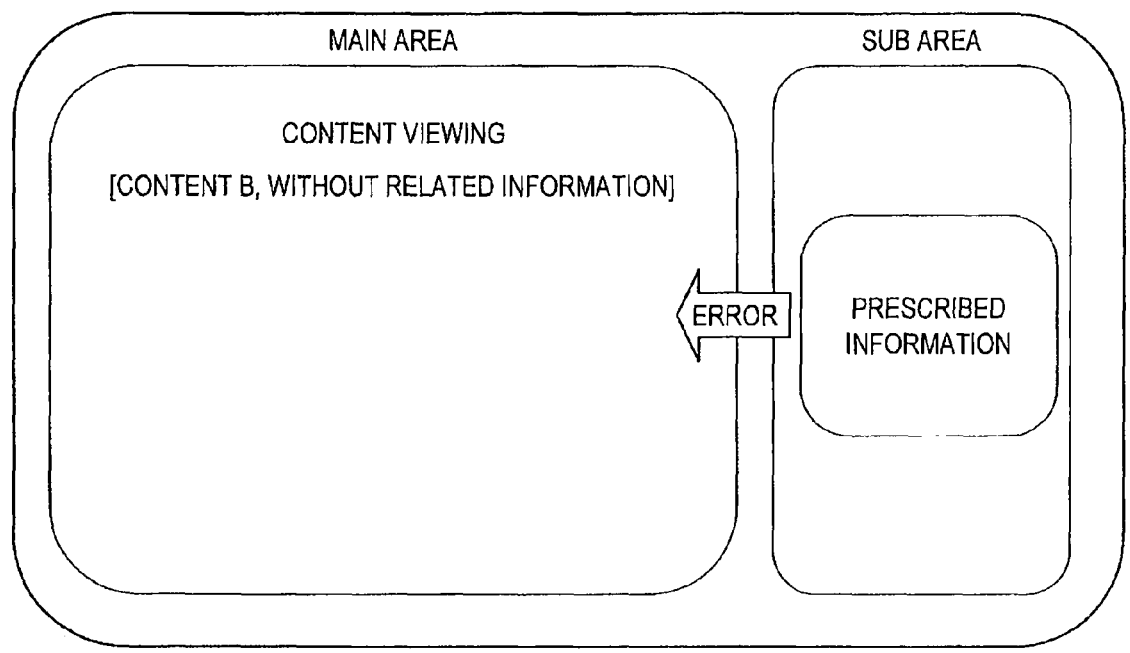
FIG. 13C is an explanatory view conceptually showing a display pattern of a content and related information.

Referring to FIG. 13C, while the content B is displayed in the main area, the related information B of the content B is not displayed in the sub area. FIG. 13C shows the case where the related information B which is associated with the content B does not exist. In such a case, an icon which indicates the error state of the link mode is displayed between the main area and the sub area. In the sub area, prescribed information such as a name and logotype for the content folder 300, for example, is displayed instead of the related information B of the content B.

Figure 14A:
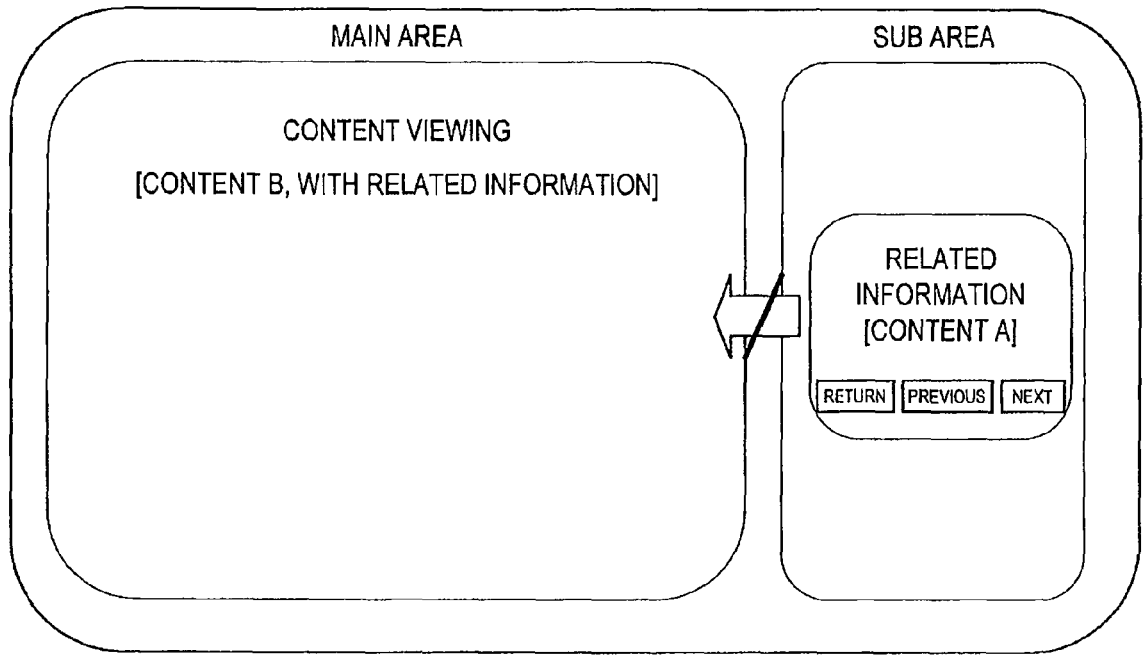
FIG. 14A is an explanatory view conceptually showing a display pattern of a content and related information.

Referring to FIG. 14A, the no link mode is selected, and the related information A of the content A is displayed in the sub area while the content B is viewed. In the central part of the sub area, operation buttons which prompt a user to make operation, such as "Return", "Previous" and "Next" buttons, are displayed in addition to the related information A of the content A. When the operation button "Previous" or "Next" is operated, the display of the information which is contained in the related information is appropriately changed in the sub area. When the operation button "Return" is operated, the mode returns to the link mode.

Figure 14B:
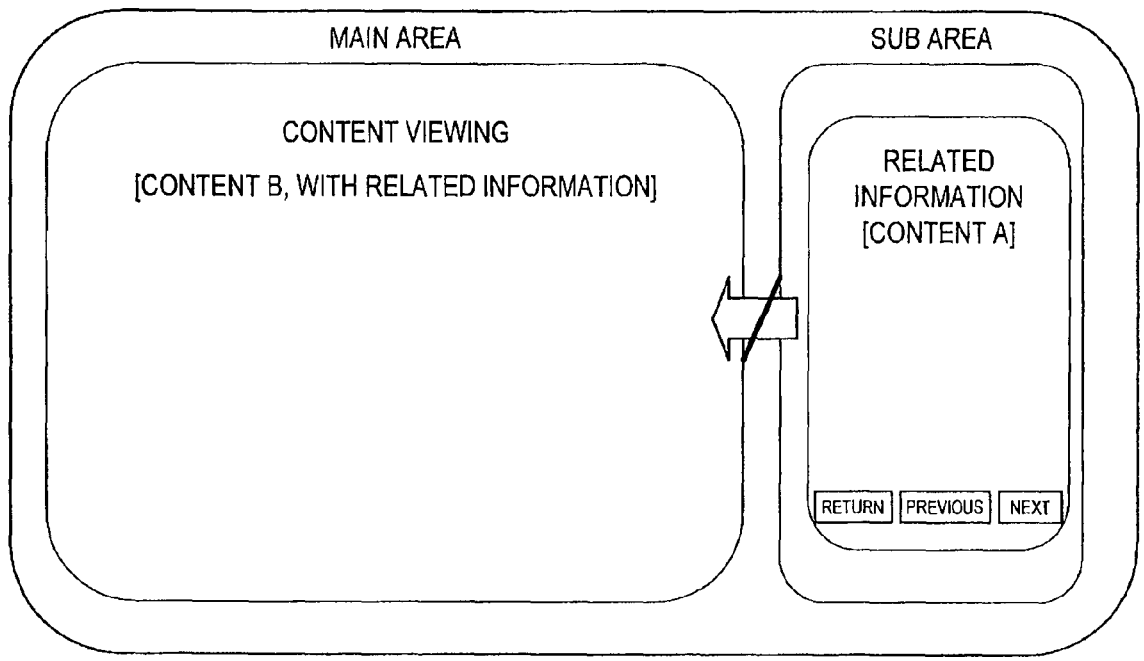
FIG. 14B is an explanatory view conceptually showing a display pattern of a content and related information.

Referring to FIG. 14B, the related information A of the content A is displayed in the sub area while the content B is viewed just like the case of FIG. 14A. However, unlike the case of FIG. 14A, the related information A of the content A is displayed in the entire part of the sub area together with the operation buttons which prompt a user to make operation.

Figure 15:
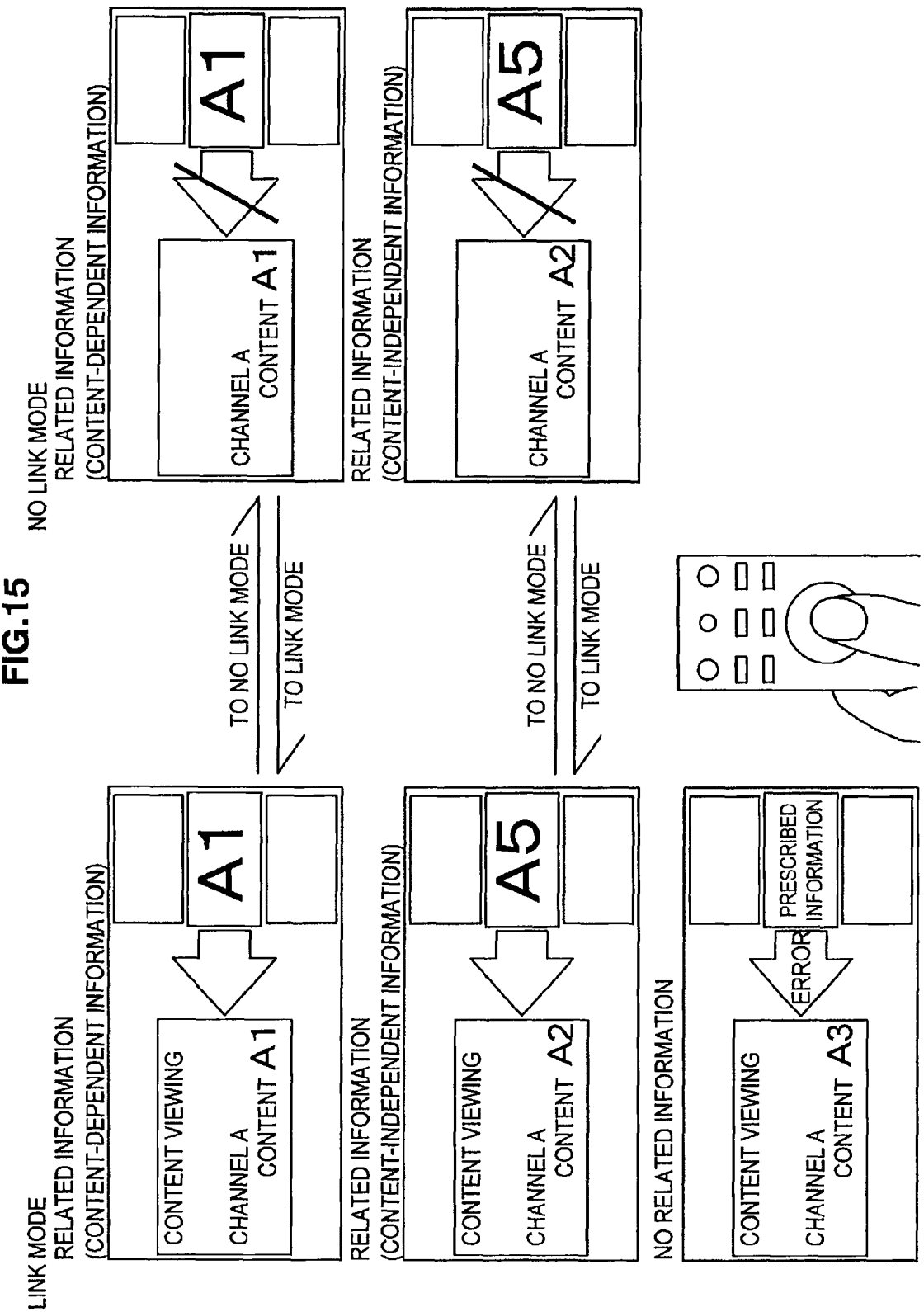
FIG. 15 is an explanatory view showing visualization of a content and related information in link/no link mode by icons.

FIG. 15 is an explanatory view showing the visualization of a content and related information in the link/no link mode by icons. In FIG. 15, the display patterns in the link mode and the no link mode are illustrated on the left side and the right side, respectively.

In the upper left part of FIG. 15, the related information A1 which is dependent on the information of the content A1 is displayed while the content A1 is viewed. Further, the icon which indicates the link mode is displayed between the main area and the sub area. When the modes are switched in this state, the mode is switched to the no link mode, and the display of the icon is changed to the icon which indicates the no link mode as shown in the upper right part of FIG. 15. When the modes are switched in the state shown in the upper right part of FIG. 15, the mode is switched to the link mode, and the display of the icon is changed as shown in the upper left part of FIG. 15.

In the middle left part of FIG. 15, the related information A5 which is independent of the information of the content A2 is displayed while the content A2 is viewed. The mode switching between the link mode and the no link mode is the same as described above and not repeatedly described herein.

In the lower left part of FIG. 15, prescribed information such as a logotype for the content folder 300 is displayed in the sub area while the content A3 is displayed in the main area. It thus illustrates the case where the related information which is associated with the content A3 does not exist, and the icon which indicates the error state of the link mode is displayed between the main area and the sub area.

Establishment of Association Between Content and Related Information

Figure 16:
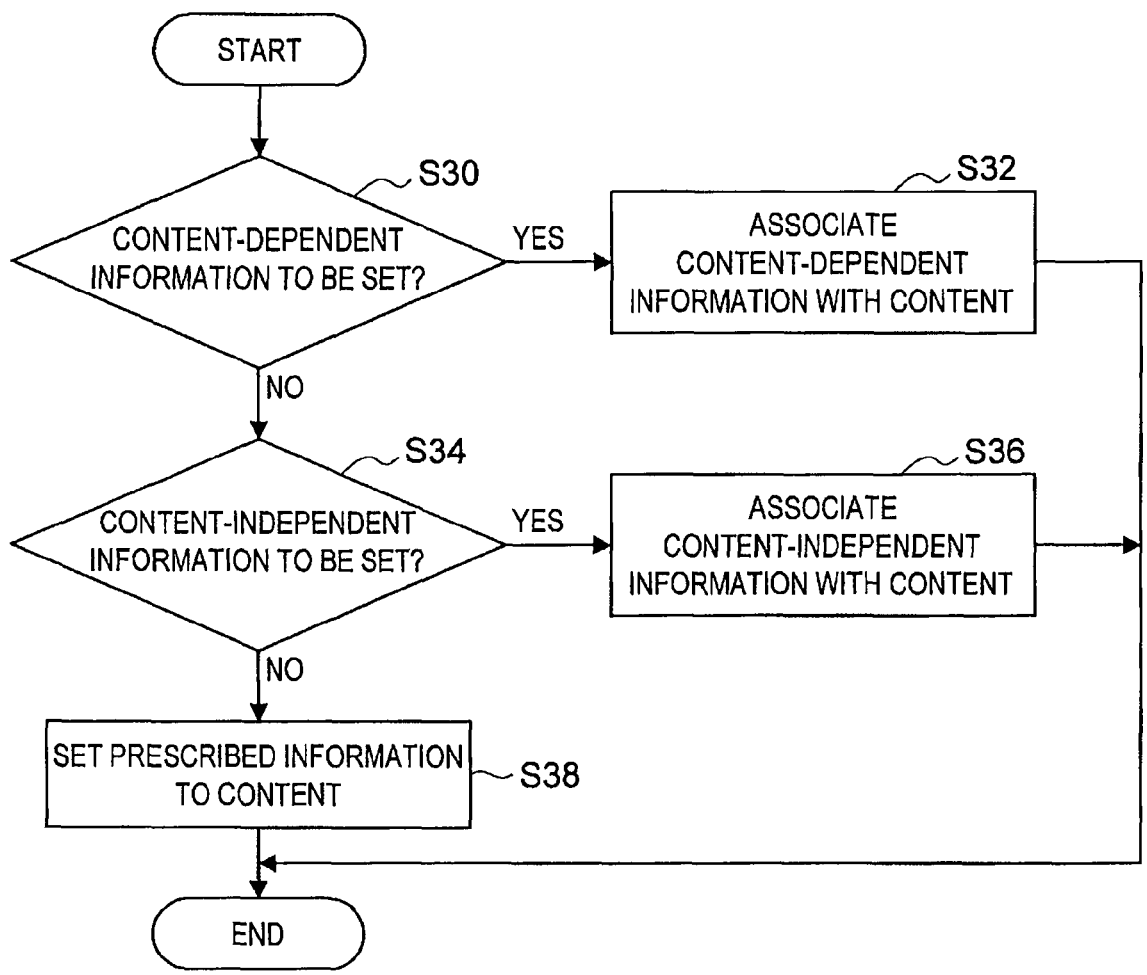
FIG. 16 is a flowchart showing an example of selection of related information to be associated with a content.

FIG. 16 is a flowchart showing an example of the selection of related information (ECG scenario) to be associated with a content.

Referring to FIG. 16, it is determined whether to set an ECG scenario which contains content-dependent information as related information of a content (S30). If it is determined to set such an ECG scenario, the ECG scenario which contains content-dependent information is associated with the content (S32). On the other hand, if it is determined not to set such an ECG scenario, it is further determined whether to set an ECG scenario which contains content-independent information such as information concerning another content (S34). If it is determined to set such an ECG scenario, the ECG scenario which contains content-independent information is associated with the content (S36). On the other hand, if it is determined not to set such an ECG scenario, an ECG scenario which contains prescribed information such as a name and a logotype for the content folder 300, for example, is set as related information of the content without establishing association (S38).

If an ECG scenario which contains content-independent information is associated as related information of the content, the following advantages are expected. For example, if an ECG scenario which is related to a content of a program that is scheduled to be broadcasted is associated, the content folder 300 can prompt a user to view the content, and a user can easily make recording reservation or viewing reservation of the content. Further, if an ECG scenario which is related to a VOD content that does not depend on program scheduling is associated, the content folder 300 can prompt a user to view the content, and a user can easily purchase and view the content. A plurality of ECG scenarios may be associated as related information of a content, and priorities may be set to the ECG scenarios.

FIGS. 17A and 17B are sequence charts showing the flow from the production to the provision of a content and related information. FIGS. 17A and 17B illustrate the cases where content-dependent information and content-independent information are provided as related information, respectively.

When content-dependent information is provided as related information as shown in FIG. 17A, a content production portion such as the content folder 300 produces a content and instructs an ECG data production portion to produce related information (ECG scenario) which is dependent on the content (S40). The ECG data production portion, which is a part of the ECG server 200, produces an ECG scenario based on the instruction from the content production portion and then instructs a Web display portion to associate the ECG scenario which contains content-dependent information to the content (S42). The Web display portion, which is also a part of the ECG server 200, makes setting to distribute the ECG scenario which contains the content-dependent information in association with the content. Then, the Web display portion provides the ECG scenario which contains the content-dependent information (S44) to a user in addition to provision of the content by the content production portion (content folder 300) (S46).

On the other hand, when content-independent information is provided as related information as shown in FIG. 17B, the content production portion instructs the ECG data production portion not to produce an ECG scenario which is dependent on the content (S50). The ECG data production portion thereby uses an ECG scenario which contains content-independent information that is produced separately, such as information concerning a content of a program that is scheduled to be broadcasted, a content of VOD that does not depend on program scheduling and so on, instead of producing an ECG scenario which contains content-dependent information. Further, when an ECG scenario which contains content-independent information is not produced, the ECG data production portion uses an ECG scenario with prescribed information such as a name and a logotype for the content folder 300. Then, the ECG data production portion instructs the Web display portion to associate the ECG scenario which contains content-independent information to the content (S52). The subsequent processing (S54, S56) is the same as described above except that the content-independent information is used instead of the content-dependent information, and thus not repeatedly described.

Process Flow of Related Information

Figure 18:
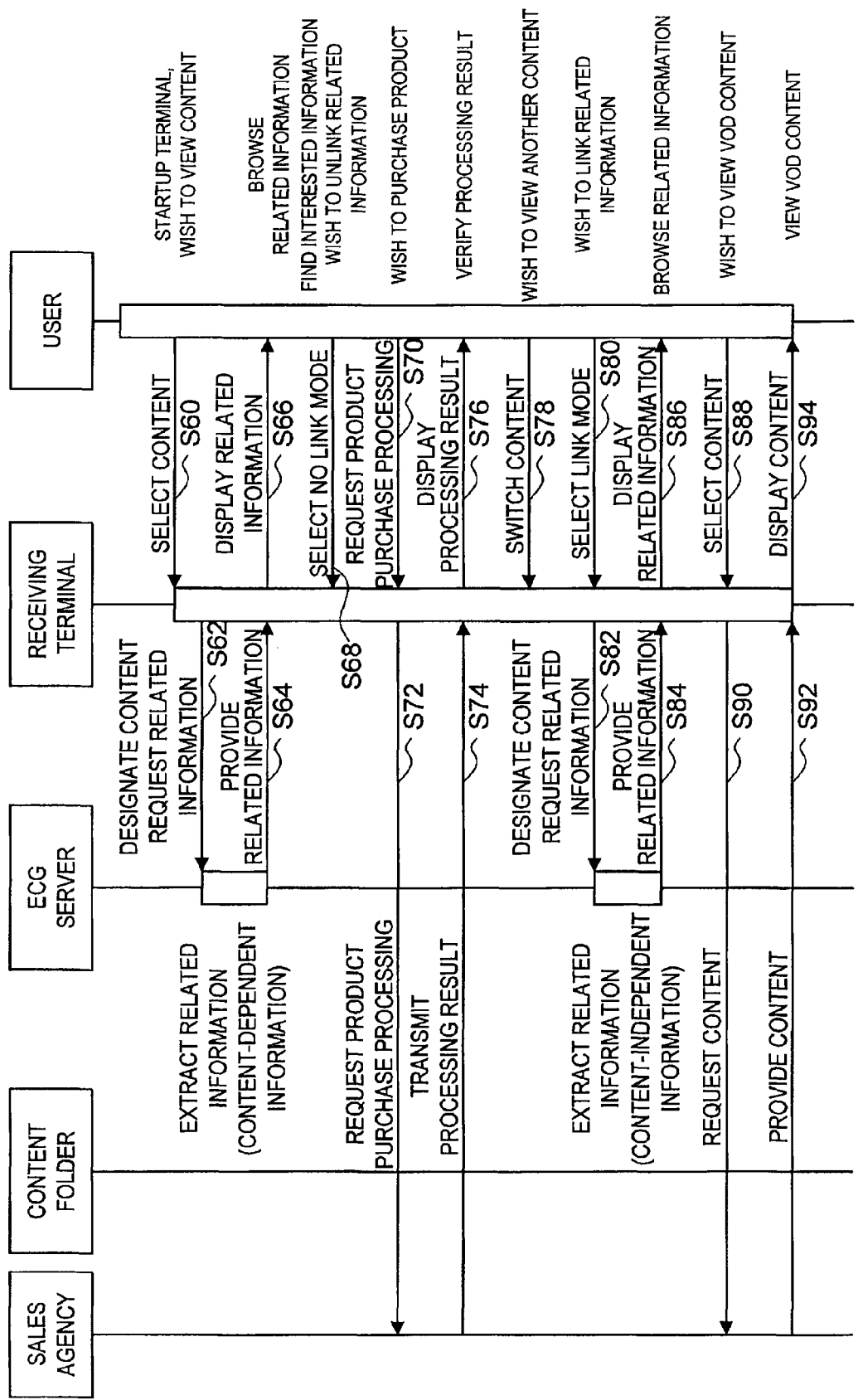
FIG. 18 is a sequence chart showing an example of a process flow of related information in an entire information providing system.

FIG. 18 is a sequence chart showing an example of the process flow of related information (ECG scenario) in the information providing system as a whole. The process flow of an ECG scenario in the entire information providing system is described hereinafter with reference to FIG. 18.

A user starts up the broadcast receiving terminal 100 and selects a content to view by channel operation or the like (S60). When a content to view is selected, the broadcast receiving terminal 100 transmits content designation information which designates the selected content and a request for providing related information (ECG scenario) of the selected content to the ECG server 200 (S62). In response to the request for an ECG scenario, the ECG server 200 extracts the ECG scenario for the designated content based on the content designation information and provides the extracted ECG scenario to the broadcast receiving terminal 100 (S64). The broadcast receiving terminal 100 executes the provided ECG scenario and sequentially displays the information, thereby providing the related information of the content to the user (S66).

If a user finds interested information in the related information which is contained in the ECG scenario, the user switches the mode into the no link mode (S68). The user can thereby browse the related information of the content independently of the currently viewed content and selects service provision information which introduces a product that is sold by the sponsor 400 as a sales agency, for example.

If the user wishes to purchase the product, the user requests product purchase processing (S70). When the product purchase processing is requested, the broadcast receiving terminal 100 requests the sponsor 400 serving as a sales agency to perform the product purchase processing (S72) and acquires a result of the product purchase processing from the sponsor 400 (S74). The broadcast receiving terminal 100 transmits and receives the information about a request for product purchase processing and information about a result of product purchase processing between the user and the sponsor 400 (S70 to S76). The product purchase processing is thereby performed between the user of the broadcast receiving terminal 100 and the sponsor 400 (S76).

If the user wishes to view another content, the user selects a content to view by channel operation or the like (S78). In response to the channel operation, the displayed video information is switched into the video information concerning the selected content in the main area of the display screen of the broadcast receiving terminal 100. On the other hand, because the no link mode is selected, the ECG data concerning the product purchase processing remains displayed in the sub area regardless of the switching of the contents.

Therefore, if the user wishes to link related information, the user switches the mode to the link mode (S80). When the mode is switched to the link mode, the broadcast receiving terminal 100 transmits content designation information which designates the selected content and a request for providing an ECG scenario of the selected content to the ECG server 200, as in the above-described case (S82). Then, the ECG server 200 provides the ECG scenario of the designated content based on the content designation information to the broadcast receiving terminal 100 (S84), and the broadcast receiving terminal 100 provides the related information of the content to the user (S86). The related information of the content may include content-independent information which is related to VOD content, for example.

If the user finds interested information in the related information which is contained in the ECG scenario, the user selects the service provision information which introduces a VOD content that is provided by the sponsor 400 serving as a sales agency, for example.

If the user wishes to view the VOD content, the user determines the viewing of the content (S88). When the viewing of the content is determined, the broadcast receiving terminal 100 requests the sponsor 400 serving as a content folder to provide the content (S90) and receives the content which is provided from the sponsor 400 (S92). The content viewing processing is thereby performed between the user of the broadcast receiving terminal 100 and the sponsor 400, so that the user can view the provided content (S94).

Transition Pattern of Content and Related Information

FIGS. 19A, 19B, 20A and 20B are explanatory views showing the transition patterns of contents and related information according to the mode switching.

Figure 19A:
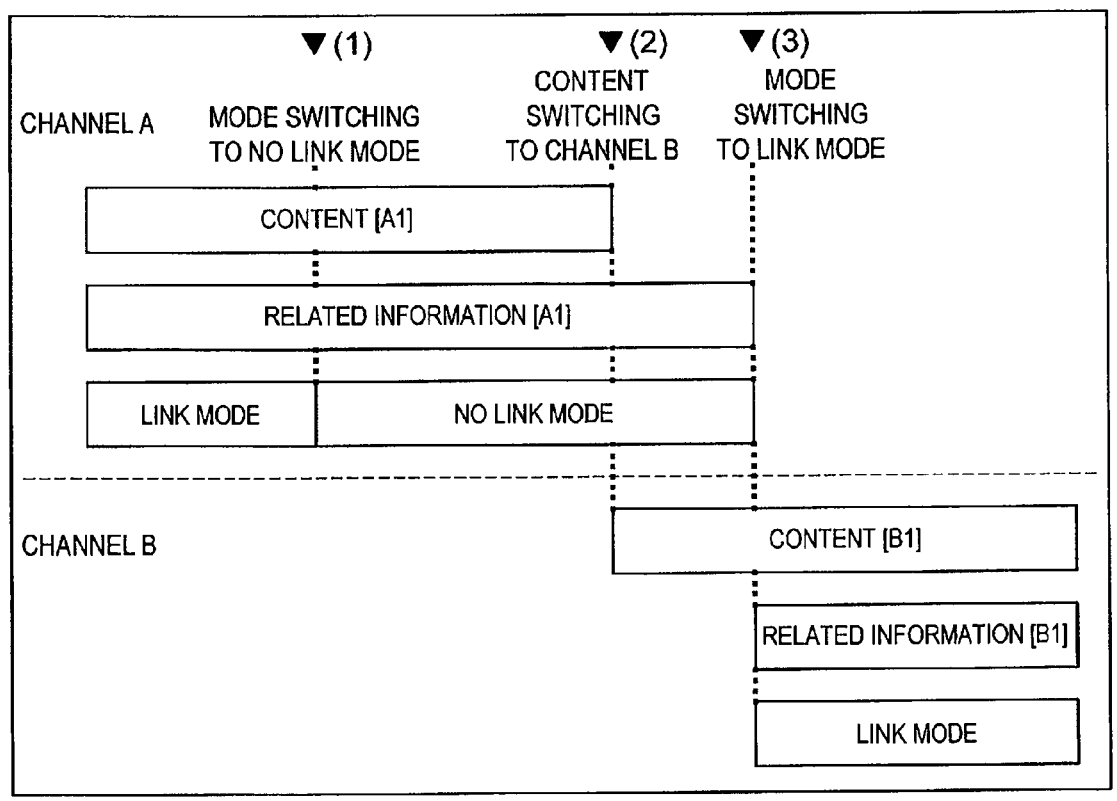
FIG. 19A is an explanatory view showing a transition pattern of a content and related information in response to mode switching.

Referring to FIG. 19A, the related information A1 (content-dependent information) of the content A1 is displayed in the sub area while the content A1 is viewed in the link mode. The mode is then switched to the no link mode by the operation (1); however, the related information A1 of the content A1 remains displayed in the sub area. After that, when the content is switched to the content B1 by the operation (2), the video information of the content B1 is displayed in the main area instead of the video information of the content A1. Still, because it is in the no link mode, the related information A1 of the content A1 remains displayed in the sub area regardless of the switching of the contents.

Finally, when the mode is switched to the link mode by the operation (3), the broadcast receiving terminal 100 transmits content designation information which designates the content B1 to be received and a related information request to the ECG server 200. Then, the ECG server 200 extracts the related information B1 which is associated with the content B1 that is designated by the content designation information and transmits the extracted related information B1 to the broadcast receiving terminal 100. The broadcast receiving terminal 100 receives the related information B1 of the content B1 and displays the related information B1 of the content B1, instead of the related information A1 of the content A1, in the sub area.

Figure 19B:
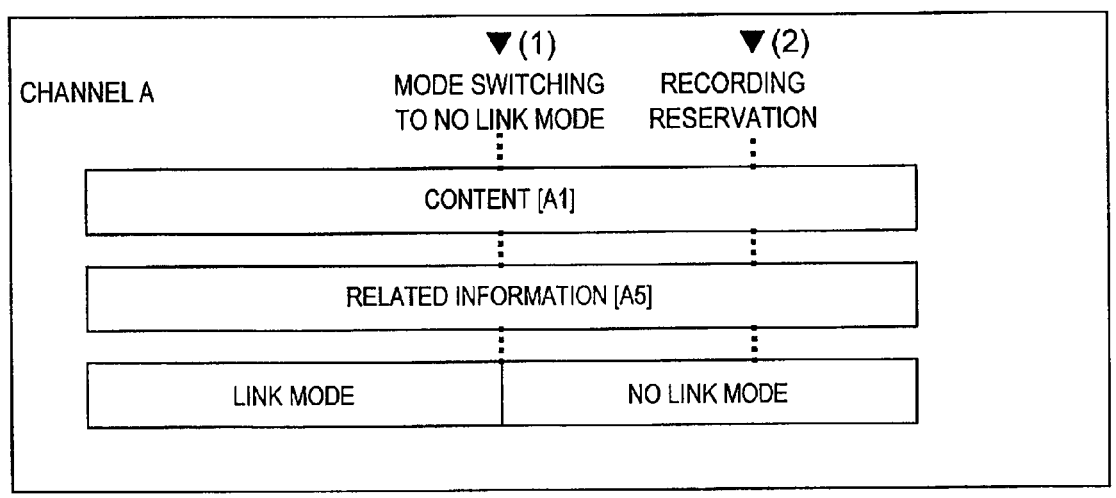
FIG. 19B is an explanatory view showing a transition pattern of a content and related information in response to mode switching.

Referring to FIG. 19B, the related information A5 (content-independent information) of the content A1 is displayed in the sub area while the content A1 is viewed in the link mode. The mode is then switched to the no link mode by the operation (1); however, the related information A5 of the content A1 remains displayed in the sub area. After that, recording reservation is selected by the operation (2); however the related information A5 of the content A1 remains displayed in the sub area because it is in the no link mode. Although the related information A5 is content-independent information which is not dependent on the currently viewed content A1, because it is the related information of the content A1, it is not affected by the switching of the contents during the no link mode.

Figure 20A:
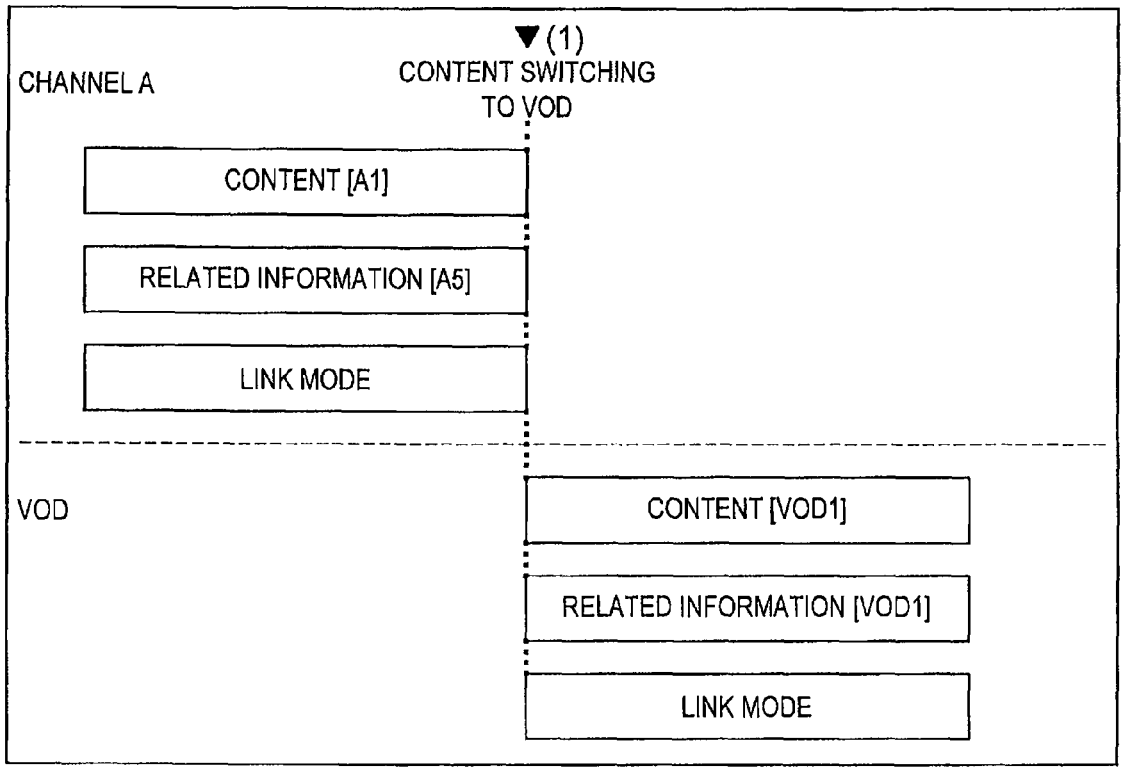
FIG. 20A is an explanatory view showing a transition pattern of a content and related information in response to mode switching.

Referring to FIG. 20A, the related information A5 (content-independent information) of the content A1 is displayed in the sub area while the content A1 is viewed in the link mode. When the content is switched to a content VOD1 by the operation (1), the video information of the content VOD1 is displayed instead of the video information of the content A1. Further, like the case of FIG. 19A, content designation information which designates the content VOD1 and a related information request are transmitted to the ECG server 200, and the related information VOD1 which is associated with the content VOD1 is extracted and transmitted to the broadcast receiving terminal 100. The broadcast receiving terminal 100 thereby receives the related information VOD1 of the content VOD1 and displays the related information VOD1 of the content VOD1 in the sub area.

Figure 20B:
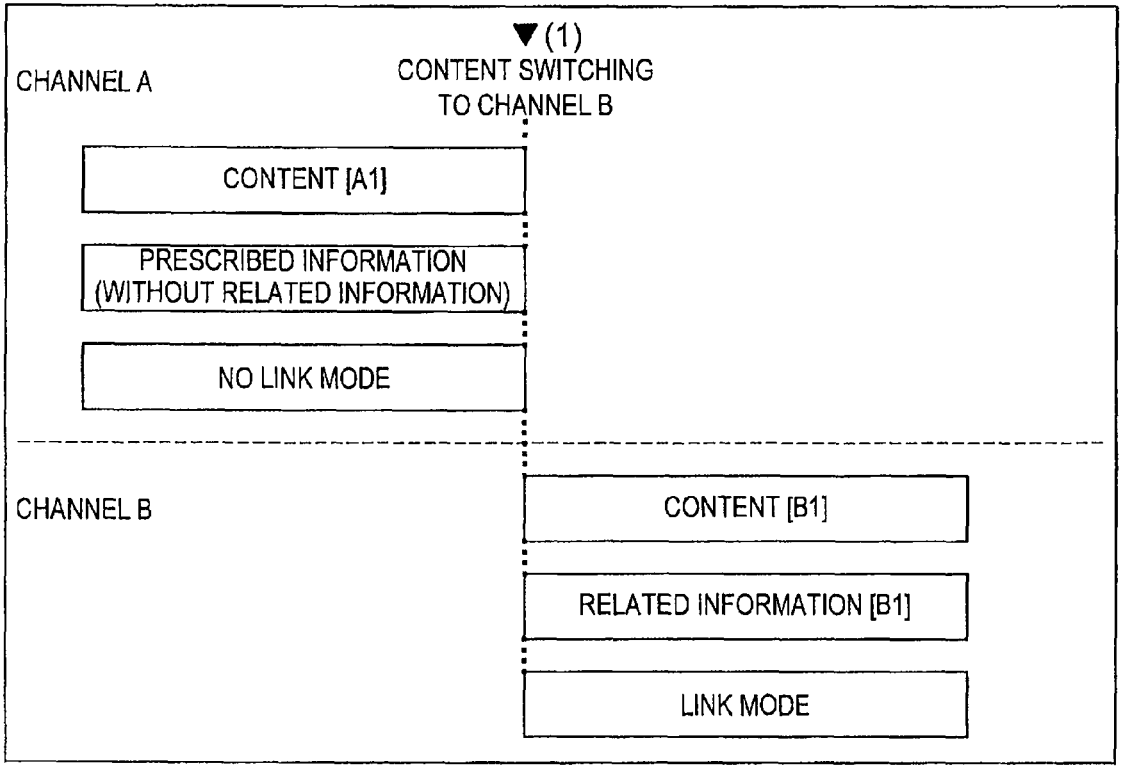
FIG. 20B is an explanatory view showing a transition pattern of a content and related information in response to mode switching.

Referring to FIG. 20B, while the video information of the content A1 is displayed in the main area, related information is not displayed in the sub area. FIG. 20B illustrates the case where there is no related information which is associated with the content A1. In such a case, because the related information does not exist, it is unable to link provided related information to the switching of the contents, so that the mode is fixed to the no link mode. When the content is switched to the content B1 by the operation (1), the video information of the content B1 is displayed in the main area instead of the video information of the content A1. Because the related information of the content B1 exists, the mode is automatically switched to the link mode. Then, like the case of FIG. 19A, content designation information which designates the content B1 and a related information request are transmitted to the ECG server 200, and the related information B1 which is associated with the content B1 is extracted and transmitted to the broadcast receiving terminal 100. The broadcast receiving terminal 100 thereby receives the related information B1 of the content B1 and displays the related information B1 of the content B1 in the sub area.

FIGS. 21A and 21B are explanatory views showing the transition patterns of contents and related information according to the mode switching in the case where a content is composed of a plurality of contents which are scheduled with time.

Referring to FIG. 21A, a plurality of time-scheduled contents A1, A2, A3, A4, A5 and A6 are received. The contents A1 to A6 are respectively associated with related information A1, A2, AX, A4, A5 and AZ, which are the related information containing content-dependent information that is dependent on the corresponding content except for the related information AX and AZ.

In the scheduling of the contents shown in FIG. 21A, upon switching (1) from the content A1 to the content A2, the related information is switched from the content-dependent information A1 to the content-dependent information A2. Upon switching (2) from the content A2 to the content A3, it is switched from the content-dependent information A2 to the content-independent information AX. Upon switching (3) from the content A3 to the content A4, it is switched from the content-independent information AX to the content-dependent information A4. Upon switching (4) from the content A5 to the content A6, it is switched from the content-dependent information A5 to the content-independent information AZ. Thus, when viewing the plurality of contents A1 to A6 shown in FIG. 21A, the mode switching is possible because the related information which contains content-dependent information or content-independent information is associated with each content. The broadcast receiving terminal 100 thereby allows browsing of the received related information with or without a link to the received content by switching link conditions just like the case where the contents are not time-scheduled.

When receiving the plurality of time-scheduled contents from the content folder 300, content scheduling information which contains information concerning the switching of contents with the elapse of time is stored in the broadcast receiving terminal 100 or the ECG server 200. As the scheduling information, EPG-SI information or program listing information based on the ECG data may be used.

If the scheduling information is stored in the broadcast receiving terminal 100, the broadcast receiving terminal 100 determines the switching of contents with the elapse of time based on the scheduling information and, when the switching occurs in the link mode, it transmits content designation information which designates a content after switching and a related information request to the ECG server 200. The ECG server 200 extracts the related information which is associated with the designated content based on the content designation information and transmits the extracted related information to the broadcast receiving terminal 100. The broadcast receiving terminal 100 thereby receives the related information which is associated with the content after switching and displays the related information in the sub area.

On the other hand, if the scheduling information is stored in the ECG server 200, the broadcast receiving terminal 100 transmits the selected link condition to the ECG server 200. The ECG server 200 determines the switching of contents with the elapse of time based on the scheduling information and, when the switching occurs in the link mode, extracts the related information which corresponds to the content after switching and transmits the extracted related information to the broadcast receiving terminal 100. The broadcast receiving terminal 100 thereby receives the related information which is associated with the content after switching and displays the related information in the sub area.

The broadcast receiving terminal 100 thereby allows browsing of the related information of the content which is switched with the elapse of time with or without a link to the content after switching by switching link conditions.

The content may include a plurality of sub contents which are sectionalized by features of a program, for example, and related information may be associated with each sub content. In this case also, the sub content is processed in the same manner as the content in the broadcast receiving terminal 100 and the ECG server 200. The broadcast receiving terminal 100 thereby allows browsing of the received related information with or without a link to the received sub content by switching link conditions.

On the other hand, in FIG. 21B, although related information A1, A3, AX and AZ are respectively associated with the contents A1, A3, A4, and A6, related information is not associated with the contents A2 and A5.

In the scheduling of the contents shown in FIG. 21B, upon switching (1) from the content A1 to the content A2, it fails to switch from the content-dependent information A1 to another related information. Thus, upon switching (2) from the content A2 to the content A3, it is switched to the content-dependent information A3 from the state where there is no related information. Upon switching (3) from the content A4 to the content A5, it fails to switch from the content-independent information AX to another related information. Further, upon switching (4) from the content A5 to the content A6, it is switched to the content-independent information AZ from the state where there is no related information. Thus, when viewing the plurality of contents A1 to A6 shown in FIG. 21B, the mode switching ceases to function in some cases because no related information is associated with some contents.

Therefore, an icon which indicates whether the related information which is associated with the currently viewed content exists or not may be displayed in the main area together with the video information of the currently viewed content. In this case, the broadcast receiving terminal 100 transmits content designation information which designates the currently viewed content to the ECG server 200. The ECG server 200 verifies whether any related information is stored in association with the designated content based on the content designation information and transmits a verification result to the broadcast receiving terminal 100. Then, the broadcast receiving terminal 100 displays the presence or absence of the related information concerning the currently viewed content based on the received verification result. A user can thereby easily check the presence or absence of the related information which is associated with the received content and efficiently switch the link conditions according the presence or absence of the related information.

As described in the foregoing, according to this embodiment, the link mode or the no link mode which specifies the link condition between a received content and received related information is selected in the broadcast receiving terminal 100. If the link condition is switched to the link mode, content designation information which designates a content to be received and a related information request are transmitted to the ECG server 200. If the received content is switched in the link mode, content designation information which designates a content after switching and a related information request are transmitted to the ECG server 200. On the other hand, when the no link mode is selected, content designation information and a related information request are not transmitted to the ECG server 200. In the ECG server 200, related information is stored in association with a content, and the related information which corresponds to the designated content is extracted based on the received content designation information and related information request and transmitted to the broadcast receiving terminal 100. Then, in the broadcast receiving terminal 100, the display control of the content which is received from the content folder 300 and the extracted related information which is received from the ECG server 200 is performed, and the selected link condition is displayed.

Therefore, when the link condition is switched to the link mode or when the received content is switched in the link mode, a user of the broadcast receiving terminal 100 can browse the received related information with a link to the received content according to the switching of the contents. On the other hand, when the no link mode is selected, a user of the broadcast receiving terminal 100 can browse the received related information without a link to the received content regardless of the switching of the contents. Consequently, a user can easily switch between passive browsing and active browsing of related information by switching the link conditions. Further, a content folder 300 can provide related information on its own when the link mode is selected.

Therefore, a user can browse the related information of the content separately from the currently viewed (received) content or the related information of the content different from the currently viewed (received) content, and it is thereby possible to reliably browse the related information of contents. Further, because the selected mode is displayed, it is possible to easily verify whether the currently browsed related information is the related information of the currently viewed (received) content. On the other hand, the content folder 300 can provide the related information of the content separately from the currently viewed (received) content or the related information of the content different from the currently viewed (received) content to a user, and it ensures the provision of the related information of contents. As a result, it is possible to efficiently prompt a user to access the provided related information.

Execution Example of ECG Scenario

FIGS. 22 to 25 are explanatory views showing display screens as an example of the execution of an ECG scenario according to the first embodiment of the present invention. The display screen as an example of the execution of an ECG scenario is described hereinafter with reference to FIGS. 22 to 25.

As shown in FIGS. 22 to 25, in an exemplary execution, video information of the currently viewed content is displayed in the main area of the display screen, and ECG data is displayed in the sub area. The sub area is sectioned into an upper part, a middle part and a lower part, and a different ECG data is displayed in each part. In the case of the exemplary execution, ECG data concerning weather information is displayed in the upper part, related information (ECG scenario) concerning the currently viewed content is displayed in the middle part, and ECG data concerning program guide information is displayed in the lower part. A user may select browsing of the ECG data which are displayed in the upper, middle and lower part of the sub area as desired.

Figure 22:
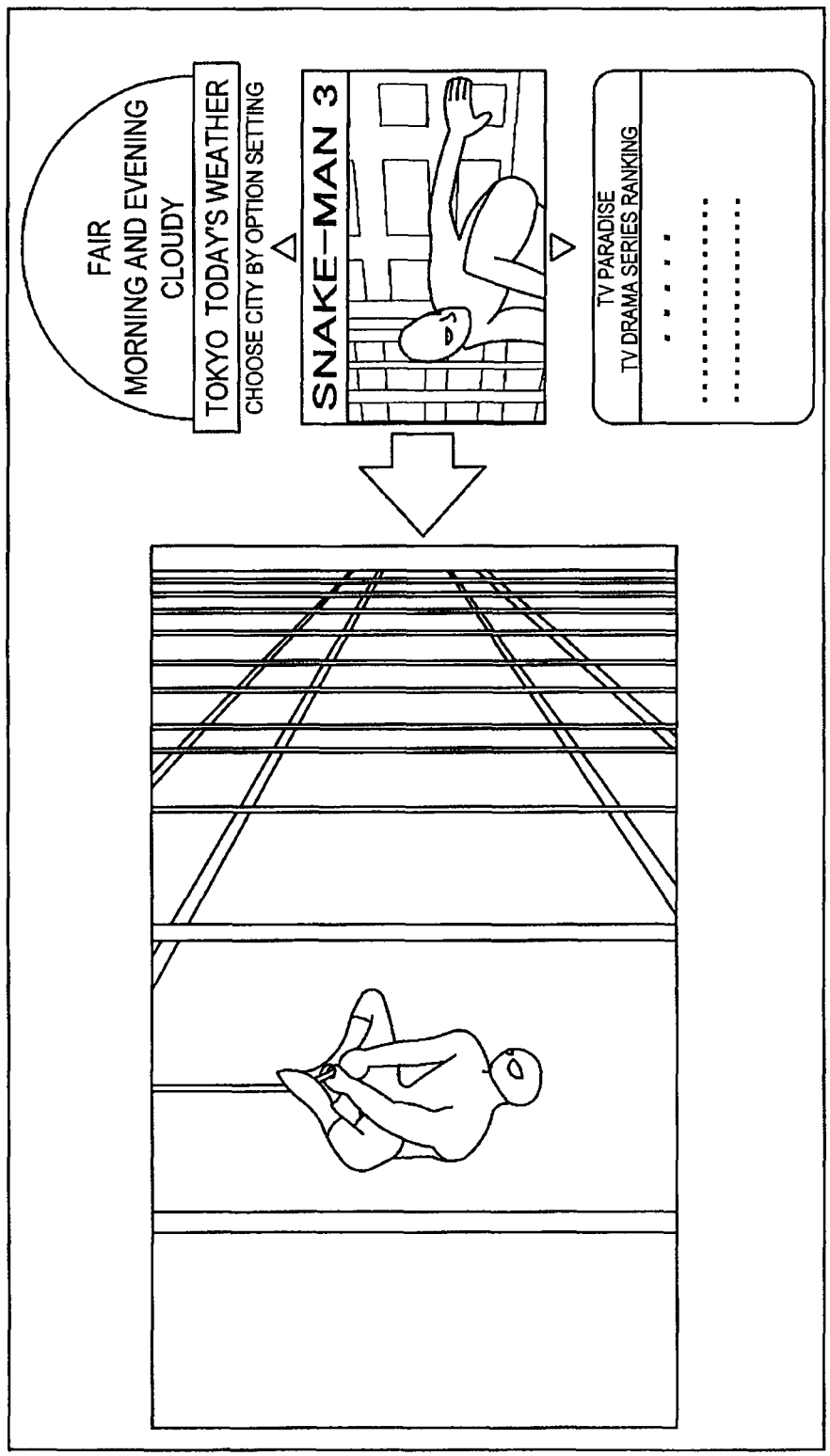
FIG. 22 is an explanatory view showing a display screen as an example of execution of an ECG scenario according to the first embodiment of the present invention.

In the middle part of the sub area of the display screen shown in FIG. 22, the ECG scenario which contains content-dependent information that is related to the currently viewed content "Snake-man 3" is executed and displayed as related information. Further, the icon which indicates the link mode is displayed between the main area and the sub area. Thus, the content-dependent information is associated with the currently viewed content.

Figure 23:
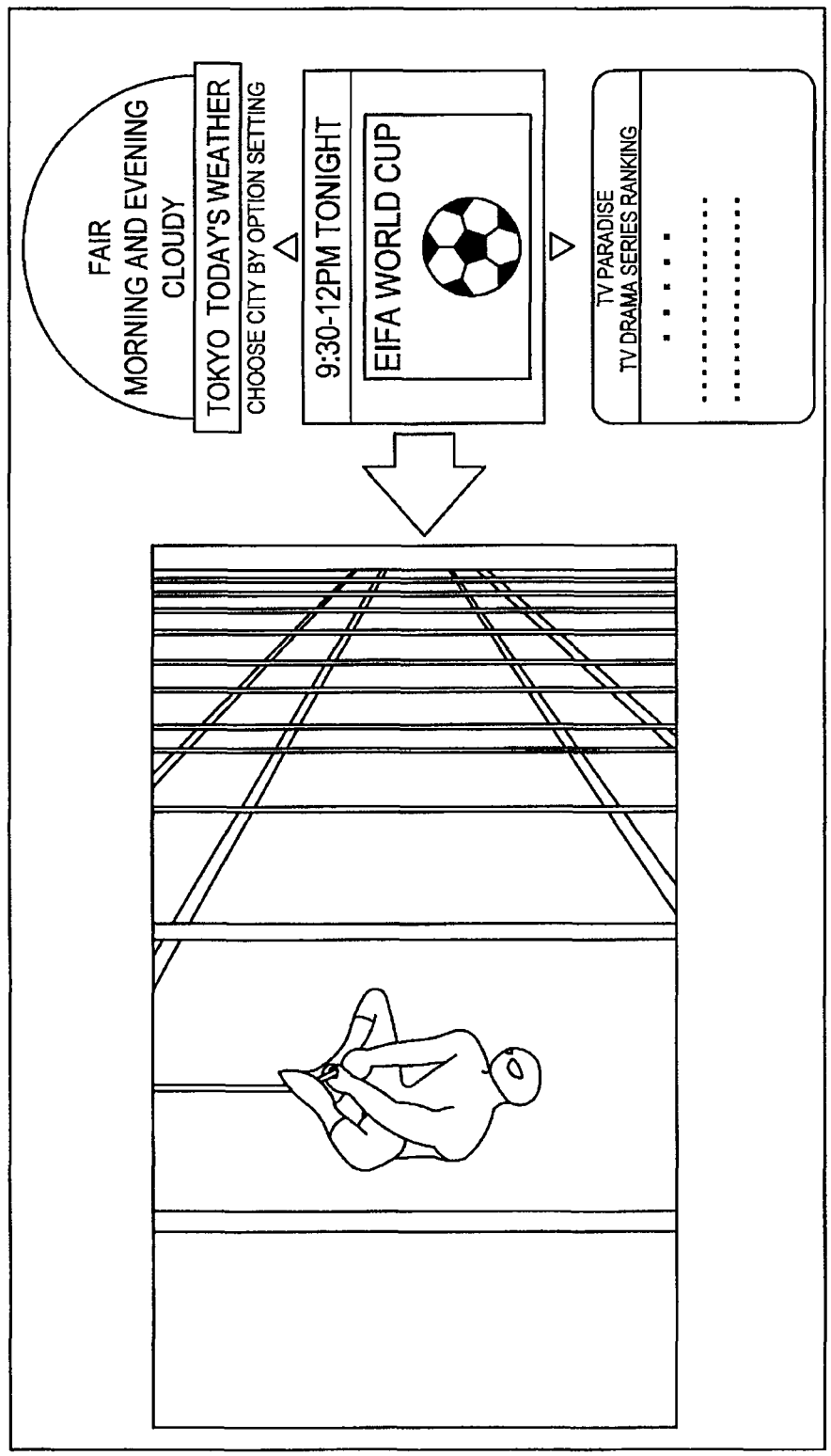
FIG. 23 is an explanatory view showing a display screen as an example of execution of an ECG scenario according to the first embodiment of the present invention.

In the middle part of the sub area of the display screen shown in FIG. 23, the ECG scenario which contains information concerning "EIFA World Cup" as content-independent information that is not dependent on the currently viewed content, instead of content-dependent information related to the currently viewed content, is executed and displayed as related information. In the display screen shown in FIG. 23 also, the icon which indicates the link mode is displayed as in the display screen shown in FIG. 22, and therefore the content-independent information is associated with the currently viewed content.

Figure 24:
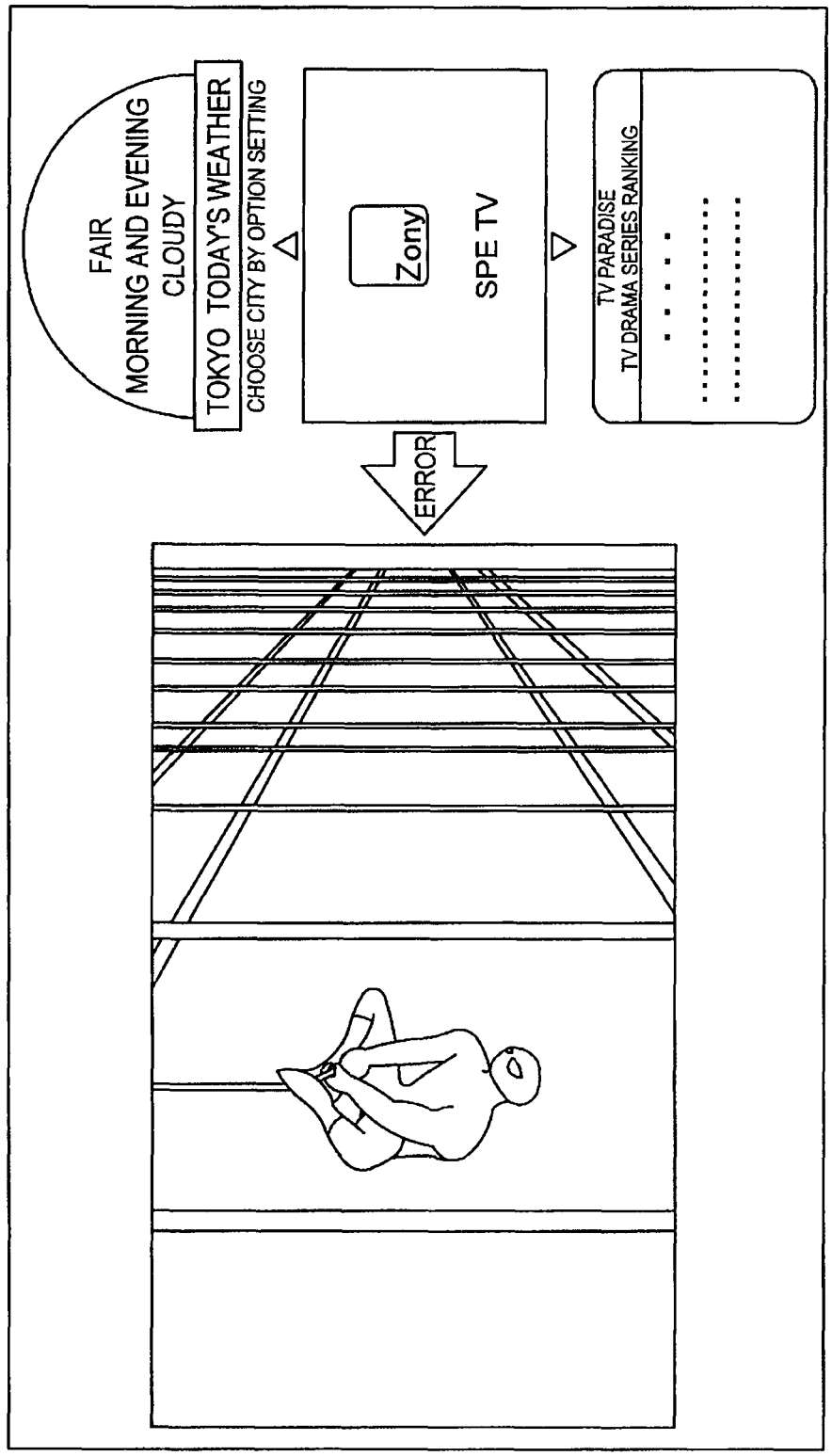
FIG. 24 is an explanatory view showing a display screen as an example of execution of an ECG scenario according to the first embodiment of the present invention.

In the middle part of the sub area of the display screen shown in FIG. 24, the ECG scenario which contains prescribed information concerning a name and a logotype for a content folder "SPETV", instead of content-dependent information related to the currently viewed content, is executed and displayed as prescribed information. In the display screen shown in FIG. 24, the icon which indicates the error state of the link mode is displayed. Therefore, no related information is associated with the currently viewed content, or related information is not acquired for some reason.

Figure 25:
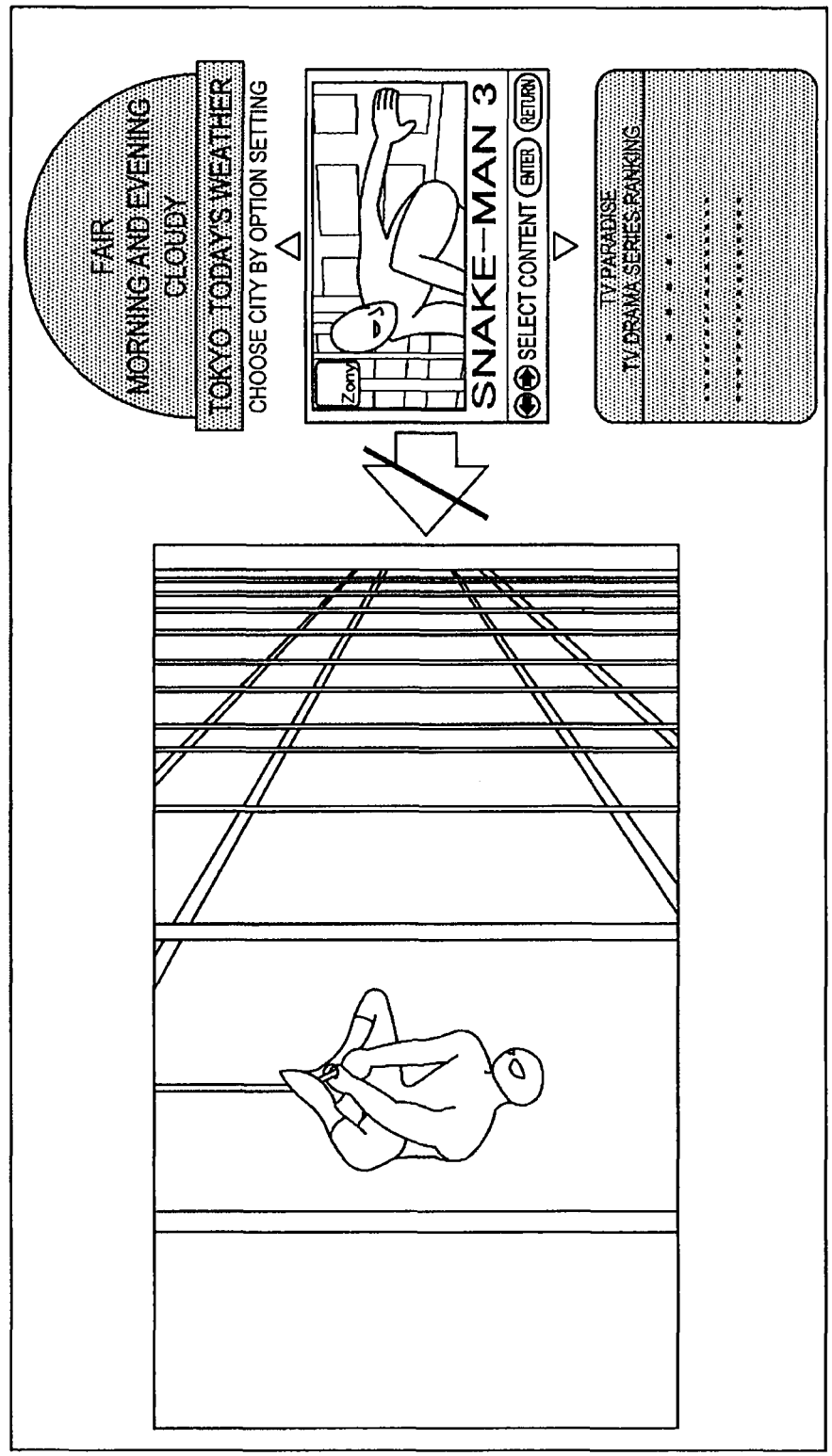
FIG. 25 is an explanatory view showing a display screen as an example of execution of an ECG scenario according to the first embodiment of the present invention.

In the middle part of the sub area of the display screen shown in FIG. 25, the ECG scenario which contains content-dependent information related to the currently viewed content is executed and displayed as related information. Further, the icon which indicates the no link mode is displayed. Furthermore, the operation buttons such as "Select content", "Enter" and "Return" are displayed together with the related information. The display of the ECG data in the upper part and the lower part of the sub area are darkened, so that a user is unable to select browsing of those ECG data in this state. Thus, a user can browse only the related information of the content separately from the currently viewed content by appropriately operating the operation buttons. The mode can be switched from the no link mode to the link mode according to need.

Second Embodiment

As a second embodiment of the present invention, a case of receiving information such as text, audio and image as a content from a content folder is described hereinafter.

The configuration or the like of the information providing system, the information providing apparatus and the information receiving apparatus according to this embodiment is the same as that of the first embodiment in some points, and the redundant points are not repeatedly described below. The information providing system according to this embodiment is characteristic in that it receives or provides information such as text, audio and image instead of or together with a broadcast program which is received or provided as a content in the first embodiment.

In the information providing system according to this embodiment, the content folder is not limited to a TV station, a data broadcast station, a program distribution agency or the like, and it is described as a general content folder. Further, the information receiving apparatus is not limited to a broadcast receiving terminal, and it is described as a general information receiving terminal. Thus, the information receiving apparatus does not necessarily include an element such as a broadcast receiving portion which is necessary for a broadcast receiving terminal.

Figure 26:
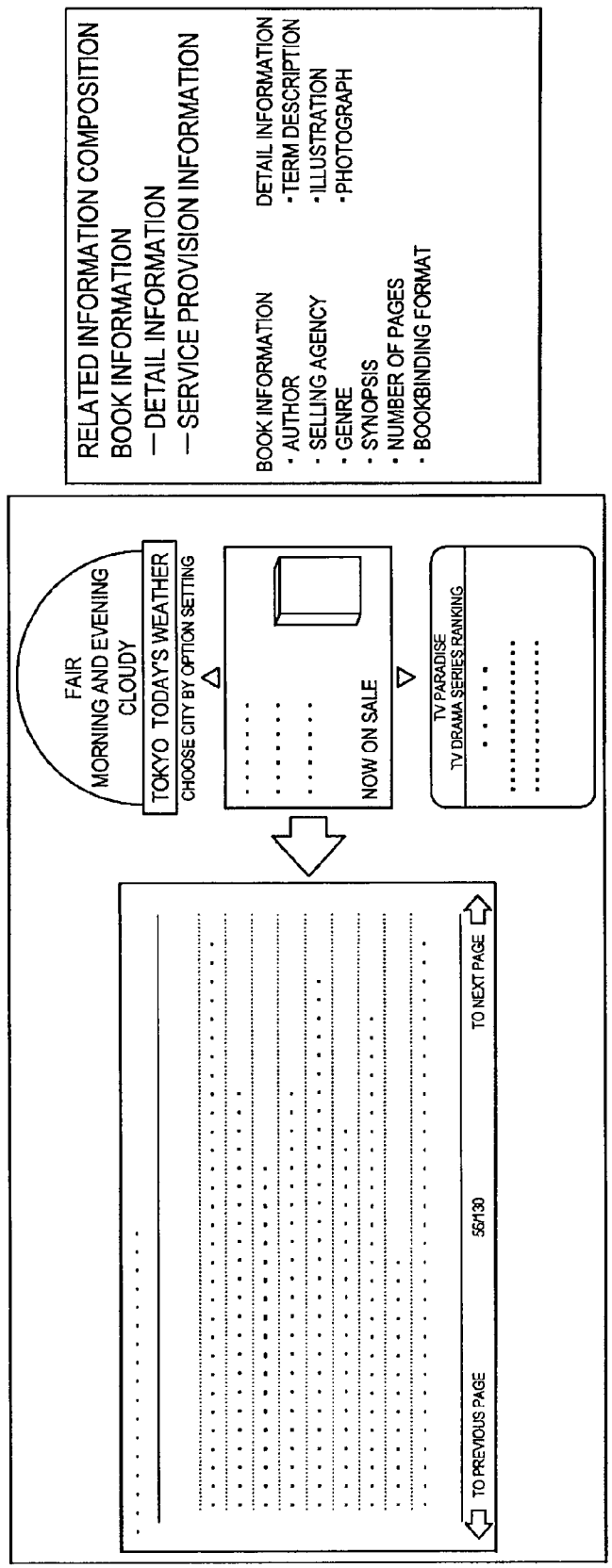
FIG. 26 is an explanatory view showing a display screen as an example of execution of an ECG scenario according to a second embodiment of the present invention.
Figure 27:
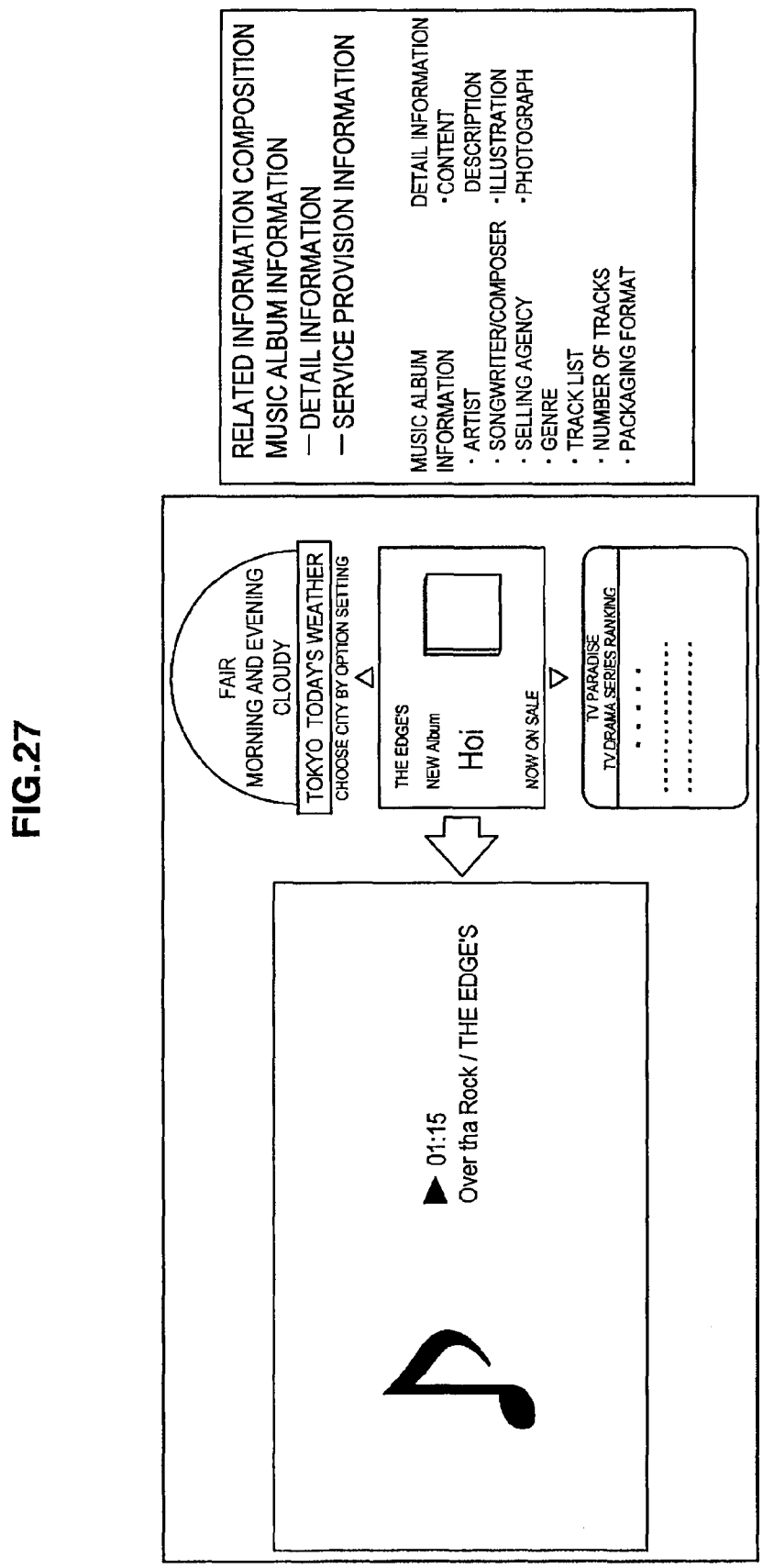
FIG. 27 is an explanatory view showing a display screen as an example of execution of an ECG scenario according to the second embodiment of the present invention.
Figure 28:
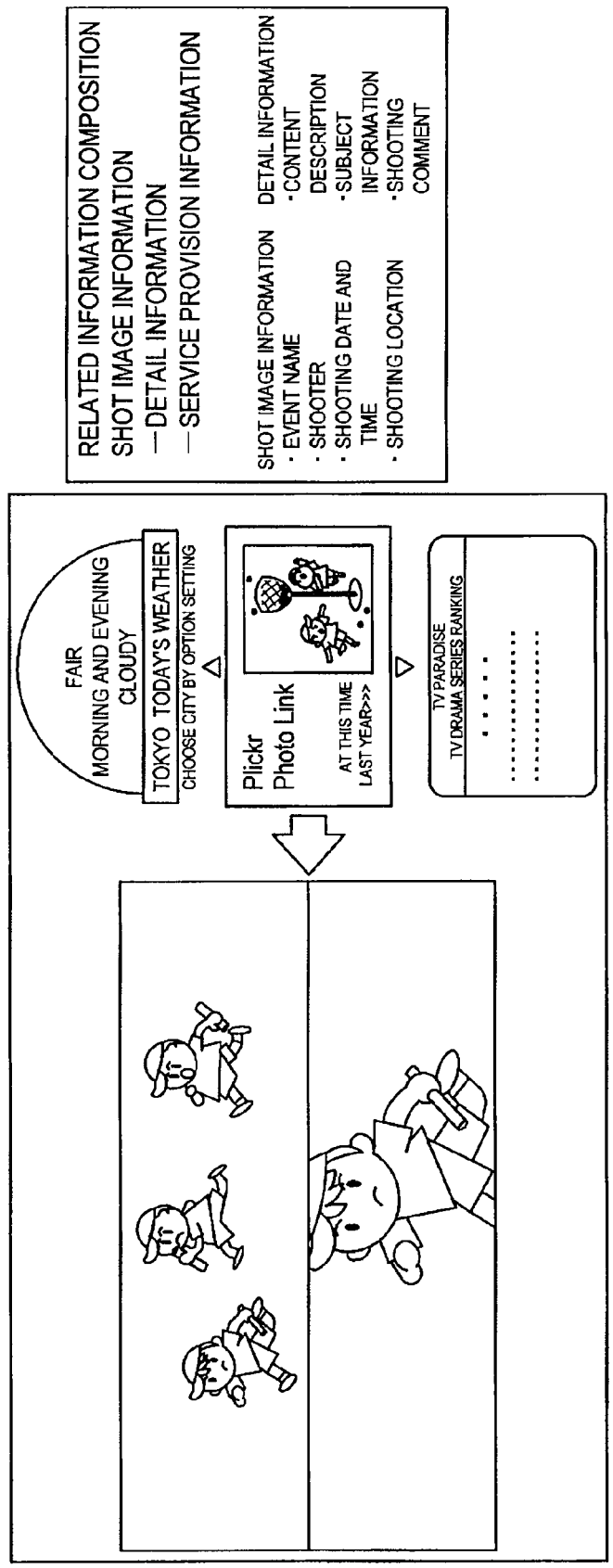
FIG. 28 is an explanatory view showing a display screen as an example of execution of an ECG scenario according to the second embodiment of the present invention.

FIGS. 26 to 28 are explanatory views showing the display screens as an example of the execution of an ECG scenario according to this embodiment. The display screens as an example of the execution of an ECG scenario is described hereinafter with reference to FIGS. 26 to 28.

As shown in FIGS. 26 to 28, in an exemplary execution, information of the currently viewed content is displayed in the main area of the display screen, and ECG data is displayed in the sub area. The sub area is sectioned into an upper part, a middle part and a lower part, and a different ECG data is displayed in each part. In the case of the exemplary execution, related information (ECG scenario) concerning the currently viewed content is displayed in the middle part. In the following description, the expression "display of a content and related information" includes the meaning "playback of a content and related information".

In the middle part of the sub area of the display screen shown in FIG. 26, an ECG scenario which is related to an electronic book, which is the currently viewed content, is executed and displayed as related information. Further, the icon which indicates the link mode is displayed between the main area and the sub area. The related information of the content as an electronic book may include book information, detail information and service provision information. The book information includes information such as a book's author, selling agency, genre, synopsis, number of pages and bookbinding format, for example. The detail information includes information such as descriptions of terms in a book, illustrations and photographs, for example. The service provision information includes information about sales, advertising and event concerning a related book, for example.

In the middle part of the sub area of the display screen shown in FIG. 27, an ECG scenario which is related to a music album "The Edge's Hoi", which is the currently viewed (played back) content, is executed and displayed as related information. Further, the icon which indicates the link mode is displayed. The related information of the content as a music album includes music information, detail information and service provision information, for example. The music information includes information such as an album's artist, songwriter, composer, selling agency, genre, track list, number of tracks and packaging format, for example. The detail information includes information such as descriptions of contents of the album, illustrations and photographs, for example. The service provision information includes information about sales, advertising and event concerning a related album, for example.

In the middle part of the sub area of the display screen shown in FIG. 28, an ECG scenario which is related to shot images "School athletic meet", which is the currently viewed content, is executed and displayed as related information. Further, the icon which indicates the link mode is displayed. The related information of the content as shot images includes shot event information, detail information and service provision information, for example. The shot event information includes information such as a shot event name, a shooter, a shooting date and time and a shooting location, for example. The detail information includes information such as descriptions of the shot images, a subject name and age and shooting comments, for example. The service provision information includes information about a past related event, for example.

In the case of the content that is the electronic book, the book information, the detail information and the service provision information are stored in association with one another and with the content of the electronic book as described as the program information and the service provision information in the first embodiment. Upon switching between the contents of a plurality of electronic books, a user can browse the received related information with or without a link to the received content by switching link conditions just like the first embodiment. Further, upon switching between different kinds of contents such as between a contents of an electronic book and a content of a broadcast program, a user can browse the received related information with or without a link to the received content by switching link conditions.

The content may include a plurality of sub contents which are sectionalized by chapters of an electronic book, tracks of a music album and shot scenes of a shot image, for example, and related information may be associated with each sub content. Further, the content may be composed of a plurality of time-scheduled sub contents.

In this case also, the sub content is processed in the same manner as the content, and an information receiving apparatus allows browsing of the received related information with or without a link to the received content by switching the link conditions as in the first embodiment. Further, the information receiving apparatus allows browsing of the related information of the sub content which is switched with the elapse of time with or without a link to the sub content after switching by switching link conditions based on the scheduling information of sub contents or based on the selected link condition and the scheduling information.

In the no link mode, the information receiving apparatus may acquire the content which is stored in a storage portion of the information receiving apparatus or an external storage device as related information, instead of receiving the related information of the currently viewed content from the information providing apparatus. For example, if the content is prestored in the information receiving apparatus and the content related to the currently viewed content exists, the currently viewed content and the stored content may be set browseable at the same time.

It should be understood by those skilled in the art that various modifications, combinations, sub-combinations and alterations may occur depending on design requirements and other factors insofar as they are within the scope of the appended claims or the equivalents thereof.

What is clamed is:

1. An information receiving apparatus for receiving content from a content folder, connected with an information providing apparatus for providing related information associated with the content through a communication network, comprising:
   a first related information receiving portion to receive the related information associated with the content from the information providing apparatus, the related information being program information corresponding to attributes of the content;
   a mode selecting portion to select one from a link mode and a no link mode to specify a link condition between the received content and the received related information;
   a first related information request transmitting portion configured:
   (1), when the link condition is switched to the link mode, to transmit a related information request for requesting transmission of the related information together with content designation information designating the received content to the information providing apparatus,
   (2), when switching the received content in the link mode, to transmit the related information request together with content designation information designating the switched-to content, after the switching, to the information providing apparatus, and
   (3), when switching the received content in the no link mode, not to transmit the related information request and a content designation information to the information providing apparatus so that related information received prior to the switching of the received content is received after the switching of the received content; and
   a display control portion to perform (a) display control of the received content and the related information received from the information providing apparatus based on the content designation information and the related information request and (b) display control of the selected link condition.

2. The information receiving apparatus according to claim 1, when receiving a plurality of time-scheduled contents from the content folder, further comprising:
   a scheduling information storage portion to store scheduling information of the content including information concerning switching of the content with elapse of time; and
   a second related information request transmitting portion to transmit the related information request and the content designation information designating the content after switching to the information providing apparatus based on the scheduling information when switching of the content to be received occurs with elapse of time in the link mode.

3. The information receiving apparatus according to claim 1, when receiving a plurality of time-scheduled contents from the content folder, further comprising:
   a link condition transmitting portion to transmit the selected link condition to the information providing apparatus; and
   a second related information receiving portion to receive the related information extracted to correspond to the content after switching by the information providing apparatus based on the scheduling information of the content including information concerning switching of the content with elapse of time and the link condition when switching of the content to be received occurs with elapse of time in the link mode.

4. The information receiving apparatus according to claim 1, further comprising:
a designation information transmitting portion to transmit the content designation information designating the content to be received to the information providing apparatus; and
a verification information receiving portion to receive verification information for verifying presence or absence of the related information stored in association with the content based on the content designation information from the information providing apparatus, wherein
the display control portion performs display control of the received verification information.

5. The information receiving apparatus according to claim 1, wherein
the related information includes one or more scenario information containing a plurality of pieces of information associated with the content in a scenario form to be sequentially displayed.

6. The information receiving apparatus according to claim 5, wherein
the related information includes scenario information containing set information in a scenario form, each set information including a combination of content information associated with the content and service provision information associated with the content information or including the content information.

7. The information receiving apparatus according to claim 1, wherein
the related information includes content-dependent information dependent on the associated content or content-independent information not dependent on the associated content.

8. The information receiving apparatus according to claim 1, wherein
the content includes a plurality of sub contents, each sub content to be processed like the content.

9. The information receiving apparatus according to claim 1, wherein:
the information providing apparatus provides a plurality of contents to the information receiving apparatus, including a first content and a second content;
when the information receiving apparatus receives the first content, first related information corresponding to the first content is displayed in response to an instruction to display related information;
in the no link mode, when the information receiving apparatus is switched to the second content from the first content, the display of the first related information is maintained; and
in the link mode, when the information receiving apparatus is switched to the second content from the first content, the display of the first related information is replaced with a display of second related information corresponding to the second content.

10. An information providing apparatus for providing related information associated with a content, connected with an information receiving apparatus for receiving the content from a content folder through a communication network, where a link mode or a no link mode specifying a link condition between the received content and the received related information is selected by the information receiving apparatus, the information providing apparatus comprising:

a related information storage portion to store the related information in association with the content, the related information being program information corresponding to attributes of the content;
a first related information request receiving portion configured:
(1), when the link condition is switched to the link mode by the information receiving apparatus, to receive a related information request for requesting transmission of the related information together with content designation information designating the content to be received by the information receiving apparatus, and
(2), when the content to be received by the information receiving apparatus is switched in the link mode, to receive the related information request together with content designation information designating the switched-to content, after the switching, from the information receiving apparatus;
a first related information extracting portion to extract the related information corresponding to the content designated by the content designation information from the related information storage portion; and
a related information transmitting portion to transmit the extracted related information to the information receiving apparatus, so that extracted related information transmitted prior to the information receiving apparatus switching the content to be received in the no link mode is transmitted after the information receiving apparatus switches the content to be received.

11. The information providing apparatus according to claim 10, when a plurality of time-scheduled contents are received by the information receiving apparatus from the content folder, further comprising:
a second related information request receiving portion to receive the related information request and the content designation information designating the content after switching from the information receiving apparatus when switching of the content to be received by the information receiving apparatus occurs with elapse of time in the link mode.

12. The information providing apparatus according to claim 10, when a plurality of time-scheduled contents are received by the information receiving apparatus from the content folder, further comprising:
a scheduling information storage portion to store scheduling information of the content including information concerning switching of the content with elapse of time;
a link condition receiving portion to receive the link condition selected by the information receiving apparatus from the information receiving apparatus; and
a second related information extracting portion to extract the related information corresponding to the content after switching from the related information storage portion based on the scheduling information and the link condition when switching of the content to be received by the information receiving apparatus occurs with elapse of time in the link mode.

13. The information providing apparatus according to claim 10, further comprising:
a designation information receiving portion to receive the content designation information designating the content to be received by the information receiving apparatus from the information receiving apparatus; and
a verification information transmitting portion to transmit verification information verifying presence or absence of the related information stored in association with the content based on the content designation information to the information receiving apparatus.

14. The information providing apparatus according to claim 10, wherein
the related information includes one or more scenario information containing a plurality of pieces of information associated with the content in a scenario form to be sequentially displayed.

15. The information providing apparatus according to claim 14, wherein
the related information includes scenario information containing set information in a scenario form, each set information including a combination of content information associated with the content and service provision information associated with the content information or including the content information.

16. The information providing apparatus according to claim 10, wherein
the related information includes content-dependent information dependent on the associated content or content-independent information not dependent on the associated content.

17. The information providing apparatus according to claim 10, wherein
the content includes a plurality of sub contents, each sub content to be processed like the content.

18. An information providing system where an information receiving apparatus for receiving a content from a content folder and an information providing apparatus for providing related information associated with the content are connected through a communication network, wherein
the information receiving system includes:
a related information receiving portion to receive the related information associated with the content from the information providing apparatus, the related information being program information corresponding to attributes of the content;
a mode selecting portion to select one from a link mode and a no link mode to specify a link condition between the received content and the received related information;
a related information request transmitting portion configured:
(1), when the link condition is switched to the link mode, to transmit a related information request for requesting transmission of the related information together with content designation information designating the received content to the information providing apparatus,
(2), when switching the received content in the link mode, to transmit the related information request together with content designation information designating the switched-to content, after the switching, to the information providing apparatus, and
(3), when switching the received content in the no link mode, not to transmit the related information request and a content designation information to the information providing apparatus so that related information received prior to the switching of the received content is received after the switching of the received content; and
a display control portion to perform (a) display control of the received content and the received related information and (b) display control of the selected link condition, and the information providing apparatus includes:
a related information storage portion to store the related information in association with the content;
a related information request receiving portion to receive the content designation information and the related information request from the information receiving apparatus;
a related information extracting portion to extract the related information corresponding to the designated content based on the content designation information; and
a related information transmitting portion to transmit the extracted related information to the information receiving apparatus, so that extracted related information transmitted prior to the information receiving apparatus switching the content to be received in the no link mode is transmitted after the information receiving apparatus switches the content to be received.

19. An information providing method applied to an information providing system where an information receiving apparatus for receiving a content from a content folder and an information providing apparatus for providing related information associated with the content are connected through a communication network, the method comprising the steps of:
selecting a mode from a link mode and a no link mode to specify a link condition between the received content and the received related information by the information receiving apparatus, the related information being program information corresponding to attributes of the content;
transmitting, including:
(1), when the link condition is switched to the link mode, a related information request for requesting transmission of the related information together with content designation information designating the received content to the information providing apparatus, and
(2), when switching the received content in the link mode, the related information request together with content designation information designating the switched-to content, after the switching, to the information providing apparatus;
when switching the received content in the no link mode, not transmitting the related information request and a content designation information to the information providing apparatus so that related information received prior to the switching of the received content is received after the switching of the received content;
receiving the related information from the information providing apparatus; and
performing display control of the received content and the received related information and display control of the selected link condition.

20. A computer-readable medium storing a program applied to an information providing system where an information receiving apparatus for receiving a content from a content folder and an information providing apparatus for providing related information associated with the content are connected through a communication network, the program causing a computer to implement functions comprising:
a related information receiving portion to receive related information associated with a content received from a content folder from the information providing apparatus, the related information being program information corresponding to attributes of the content;

a mode selecting portion to select one from a link mode and a no link mode to specify a link condition between the received content and the received related information;

a related information request transmitting portion to:

(1), when the link condition is switched to the link mode, transmit a related information request for requesting transmission of the related information together with content designation information designating the received content to the information providing apparatus, (2), when switching the received content in the link mode, transmit the related information request together with content designation information designating the switched-to content, after the switching, to the information providing apparatus, and (3), when switching the received content in the no link mode, not to transmit the related information request and a content designation information to the information providing apparatus so that related information received prior to the switching of the received content is received after the switching of the received content; and a display control portion to perform (a) display control of the received content and the related information received from the information providing apparatus based on the content designation information and the related information request and (b) display control of the selected link condition.

21. A computer-readable medium storing a program applied to an information providing system where an information receiving apparatus for receiving a content from a content folder and an information providing apparatus for providing related information associated with the content are connected through a communication network, where link mode or no link mode specifying a link condition between the received content from a content folder and the received related information is selected by the information receiving apparatus, the program causing a computer to implement functions comprising:

a related information storage portion to store the related information in association with the content, the related information being program information corresponding to attributes of the content;

a related information request receiving portion to:

(1), when the link condition is switched to the link mode by the information receiving apparatus, receive a related information request for requesting transmission of the related information together with content designation information designating the content to be received by the information receiving apparatus, and (2) when the content to be received by the information receiving apparatus is switched in the link mode, to receive the related information request together with content designation information designating the switched-to content, after the switching, from the information receiving apparatus;

a related information extracting portion to extract the related information corresponding to the content designated by the content designation information from the related information storage portion; and a related information transmitting portion to transmit the extracted related information to the information receiving apparatus, so that extracted related information transmitted prior to the information receiving apparatus switching the content to be received in the no link mode is transmitted after the information receiving apparatus switches the content to be received.

* * * * *